US012483482B2

(12) United States Patent
Hou et al.

(10) Patent No.: US 12,483,482 B2
(45) Date of Patent: Nov. 25, 2025

(54) INFORMATION PROCESSING METHOD, DEVICE AND APPARATUS, AND READABLE STORAGE MEDIUM

(71) Applicant: DATANG MOBILE COMMUNICATIONS EQUIPMENT CO., LTD., Beijing (CN)

(72) Inventors: Yunjing Hou, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/921,330

(22) PCT Filed: Mar. 9, 2021

(86) PCT No.: PCT/CN2021/079660
§ 371 (c)(1),
(2) Date: Oct. 25, 2022

(87) PCT Pub. No.: WO2021/218391
PCT Pub. Date: Nov. 4, 2021

(65) Prior Publication Data
US 2023/0353457 A1 Nov. 2, 2023

(30) Foreign Application Priority Data

Apr. 29, 2020 (CN) .......................... 202010355998.2
May 1, 2020 (CN) ........................ 202010369874.X

(51) Int. Cl.
H04L 41/14 (2022.01)
H04L 41/00 (2022.01)
(Continued)

(52) U.S. Cl.
CPC .............. H04L 41/14 (2013.01); H04L 41/00 (2013.01); H04L 41/40 (2022.05);
(Continued)

(58) Field of Classification Search
CPC ......... H04W 8/04; H04W 8/06; H04W 24/02; H04W 28/0226; H04W 48/06;
(Continued)

(56) References Cited

U.S. PATENT DOCUMENTS 11,936,534 B2 * 3/2024 Fan ........................ H04W 24/02
2011/0141888 A1 6/2011 Leguay et al.
(Continued)

FOREIGN PATENT DOCUMENTS

CN 109257769 A1 1/2019
CN 110267343 A1 9/2019
(Continued)

OTHER PUBLICATIONS

European Extended Search Report for the corresponding European Patent Application No. 21797347.8, mailed Sep. 18, 2023.
(Continued)

Primary Examiner — Dustin Nguyen
(74) Attorney, Agent, or Firm — Ladas & Parry, LLP

(57) ABSTRACT

An information processing method, device and apparatus, and a readable storage medium are provided. The information processing method includes: obtaining information of a slice; determining, in accordance with the information of the slice, at least one of an analysis result related to the quantity of UEs in the slice or an analysis result related to the quantity of PDU sessions in the slice; and transmitting at least one of the analysis result related to the quantity of UEs or the analysis result related to the quantity of PDU sessions to a target network element.

17 Claims, 5 Drawing Sheets

(51) Int. Cl.
*H04L 41/40* (2022.01)
*H04L 41/0894* (2022.01)
*H04L 43/20* (2022.01)
*H04W 84/04* (2009.01)

(52) U.S. Cl.
CPC .......... *H04L 41/0894* (2022.05); *H04L 43/20* (2022.05); *H04W 84/042* (2013.01)

(58) Field of Classification Search
CPC ..... H04W 48/18; H04W 60/00; H04W 60/04; H04W 68/12; H04W 76/18; H04W 12/71; H04W 28/0257; H04W 28/18; H04L 43/065; H04L 47/20; H04L 41/40; H04L 41/5067
See application file for complete search history.

(56) References Cited

U.S. PATENT DOCUMENTS

| | | | |
|---|---|---|---|
| 2018/0262924 A1 | 9/2018 | Dao et al. | |
| 2020/0044943 A1* | 2/2020 | Bor-Yaliniz | H04L 41/40 |
| 2020/0287800 A1* | 9/2020 | Xu | H04W 24/02 |
| 2021/0084582 A1 | 3/2021 | Li | |
| 2021/0092634 A1 | 3/2021 | Kang | |
| 2021/0204198 A1 | 7/2021 | Xin et al. | |
| 2021/0211970 A1* | 7/2021 | Lee | H04L 47/20 |
| 2021/0297977 A1* | 9/2021 | Prabhakar | H04W 8/06 |
| 2021/0392574 A1* | 12/2021 | Tiwari | H04W 68/12 |
| 2022/0070963 A1* | 3/2022 | Ianev | H04L 43/065 |
| 2022/0248314 A1* | 8/2022 | Won | H04W 8/04 |
| 2022/0248318 A1* | 8/2022 | Qiao | H04W 76/18 |
| 2022/0264428 A1* | 8/2022 | Li | H04W 28/0226 |
| 2022/0272010 A1* | 8/2022 | Marquezan | H04L 41/40 |
| 2022/0286895 A1* | 9/2022 | Lee | H04W 28/0257 |
| 2022/0369110 A1* | 11/2022 | Fan | H04W 12/71 |
| 2022/0369155 A1* | 11/2022 | Hedman | H04W 28/18 |
| 2022/0369207 A1* | 11/2022 | Ianev | H04W 76/18 |
| 2022/0377655 A1* | 11/2022 | Keller | H04W 48/18 |
| 2023/0030339 A1* | 2/2023 | Zhu | H04W 60/00 |
| 2023/0036993 A1* | 2/2023 | Velev | H04W 60/04 |
| 2023/0053127 A1* | 2/2023 | Sugawara | H04W 76/18 |
| 2023/0164668 A1* | 5/2023 | Kim | H04W 48/06 370/329 |
| 2024/0056367 A1* | 2/2024 | Samdanis | H04L 41/5067 |

FOREIGN PATENT DOCUMENTS

| | | |
|---|---|---|
| CN | 110300006 A1 | 10/2019 |
| CN | 110662261 A1 | 1/2020 |
| CN | 110972193 A1 | 4/2020 |
| WO | 2018161850 A1 | 9/2018 |
| WO | 2020001171 A1 | 1/2020 |

OTHER PUBLICATIONS

"3rd Generation Partnership Project; Technical Specification Group Services and System Aspects; Study on Enhancement of Network Slicing Phase 2 (Release 17)", 3GPP Standard; Technical Report; 3GPP TR 23.700-40, 3rd Generation Partnership Project (3GPP), No. V0.3.0 (Jan. 30, 2020), pp. 1-62.
Ericsson: "AMF and O&M solution for KI#1 and KI#2", SGPP TSG-SA WG2 meeting #136AH, S2-2000194, Incheon, Korea; Jan. 13, 2020-Jan. 17, 2020.
International Search Report for PCT/CN2021/079660 issued on Jun. 8, 2021 and its English Translation provided by WIPO.
Written Opinion for PCT/CN2021/079660 issued on Jun. 8, 2021 and its English Translation provided by WIPO.
International Preliminary Report on Patentability for PCT/CN2021/079660 issued on Oct. 27, 2022 and its English translation provided by WIPO.

* cited by examiner

INFORMATION PROCESSING METHOD, DEVICE AND APPARATUS, AND READABLE STORAGE MEDIUM

CROSS-REFERENCE TO RELATED APPLICATIONS

This application is the U.S. national phase of PCT Application No. PCT/CN2021/079660 filed on Mar. 9, 2021, which claims priorities to the Chinese patent application No. 202010355998.2 filed in China on Apr. 29, 2020 and the Chinese patent application No. 202010369874.X filed in China on May 1, 2020, which are incorporated herein by reference in their entireties.

TECHNICAL FIELD

The present disclosure relates to the field of communication technology, in particular to an information processing method, an information processing device, an information processing apparatus, and a readable storage medium.

BACKGROUND

Such a concept of network slice, i.e., a logic network supporting a certain type of service, has been introduced in a $5^{th}$-Generation (5G) network. Currently, four types of network slices, i.e., enhanced Mobile Broadband (eMBB), Ultra-Reliable and Low Latency Communications (URLLC), massive Internet of Things (mIoT) and Vehicle to Everything (V2X). An identifier of the network slice is Single Network Slice Selection Assistance Information (S-NSSAI).

Slice selection is performed in two processes. One of the two processes is a registration process in which the network selects an Access and Mobility Management Function (AMF) for serving a User Equipment (UE) and determines a network slice allowed to be used by the UE. The other of the two processes is a Protocol Data Unit (PDU) session establishment process in which the AMF selects a slice and a Session Management Function (SMF) in the slice, and then the SMF completes the establishment of user plane connection.

The quality of UEs and PDU sessions supported by the slice is limited, e.g., there are a maximum quantity of UEs and a maximum quantity of PDUs. Currently, these parameters are configured statically, so it is impossible to flexibly adjust the quantity of UEs or the quantity of PDU sessions supported by the slice.

SUMMARY

An object of the present disclosure is to provide an information processing method, an information processing device, an information processing apparatus, and a readable storage medium, so as to flexibly adjust the quantity of UEs or PDU sessions supported by a slice.

In a first aspect, the present disclosure provides in some embodiments an information processing method for a Network Data Analytics Functions (NWDAF), including: obtaining information of a slice; determining at least one of an analysis result related to the quantity of UEs in the slice or an analysis result related to the quantity of PDU sessions in the slice in accordance with the information of the slice; and transmitting at least one of the analysis result related to the quantity of UEs or the analysis result related to the quantity of PDU sessions to a target network element.

In a possible embodiment of the present disclosure, the information of the slice includes at least one of a slice rate obtained from an Operation Administration and Maintenance (OAM), a Radio Access Network (RAN) node or a User Plane Function (UPF), the average quantity of UEs or the peak quantity of UEs obtained from the target network element, the average quantity of PDU sessions or the peak quantity of PDU sessions obtained from the target network element, or an average slice rate or a peak slice rate obtained from the target network element.

In a possible embodiment of the present disclosure, subsequent to obtaining the information of the slice, the information processing method further includes obtaining region information. The transmitting at least one of the analysis result related to the quantity of UEs or the analysis result related to the quantity of PDU sessions to the target network element includes: transmitting at least one of the analysis result related to the quantity of UEs or the analysis result related to the quantity of PDU sessions to the target network element in accordance with the region information; or determining the maximum quantity of UEs or the maximum quantity of PDU sessions of the slice in different regions in accordance with the region information, and transmitting the maximum quantity of UEs or the maximum quantity of PDU sessions to a network function in the region. The target network element is located in the region corresponding to the region information.

In a possible embodiment of the present disclosure, the region information includes information of an AMF set or a slice coverage region. The determining at least one of the analysis result related to the quantity of UEs in the slice or the analysis result related to the quantity of PDU sessions in the slice in accordance with the information of the slice includes: obtaining information of the UE, the information of the UE including at least one of a service behavior of the UE, subscription information of the UE and a capability of the UE; and obtaining at least one of the analysis result related to the quantity of UEs or the analysis result related to the quantity of PDU sessions in accordance with the slice rate, the information of the UE and statistical information of slice rates of the slice in different regions.

In a possible embodiment of the present disclosure, the information processing method further includes determining an analysis result related to a backoff timer, and transmitting the analysis result related to the backoff timer to the target network element.

In a possible embodiment of the present disclosure, the determining the analysis result related to the backoff timer includes: obtaining first timestamp information and second timestamp information; and determining the analysis result related to the backoff timer in accordance with the first timestamp information and the second timestamp information. The first timestamp information is transmitted by an OAM or RAN node or a UPF when the OAM or RAN node or the UPF detects that the slice rate reaches a maximum value, and the second timestamp information is transmitted by the OAM or RAN node or the UPF when the OAM or RAN node or the UPF detects that the slice rate is smaller than the maximum value for the first time after the slice rate has reached the maximum value; or the first timestamp information is transmitted by the target network element when the target network element detects that the quantity of UEs reaches a maximum value, and the second timestamp information is transmitted by the target network element when the target network element detects that the quantity of UEs is smaller than the maximum value for a first time after the quantity of UEs has reached the maximum value; or the first timestamp information is transmitted by the target network element when the target network element detects that the quantity of PDU sessions has reached a maximum value, and the second timestamp information is transmitted by the target network element when the target network element detects that the quantity of PDU sessions is smaller than the maximum value for the first time after the quantity of PDU sessions has reached the maximum value.

In a possible embodiment of the present disclosure, the information processing method further includes transmitting an analysis result related to congestion control to the target network element.

In a possible embodiment of the present disclosure, the analysis result related to congestion control further includes third timestamp information, and the third timestamp information is used to indicate a time when the quantity of UEs in the slice reaches the maximum value and/or a time when the quantity of PDU sessions in the slice reaches the maximum value.

In a second aspect, the present disclosure provides in some embodiments an information processing method for a target network element, including receiving at least one of an analysis result related to the quantity of UEs or an analysis result related to the quantity of PDU sessions from an NWDAF.

In a possible embodiment of the present disclosure, the target network element includes a Policy Control Function (PCF) entity, an AMF entity, a Network Slice Selection Function (NSSF) entity, a Network Slice Quota (NSQ) entity, and a quota configuration function entity.

In a possible embodiment of the present disclosure, the quota configuration function entity includes a Unified Data Management (UDM), a Unified Data Repository (UDR), an OAM, an Operation & Maintenance (O&M), or a Network Repository Function (NRF).

In a possible embodiment of the present disclosure, the information processing method is applied to the quota configuration function, and further includes determining the maximum quantity of UEs or the maximum quantity of PDU sessions in a slice, and transmitting the maximum quantity of UEs or the maximum quantity of PDU sessions to the PCF entity, the AMF entity, the NSSF entity or the NSQ entity.

In a possible embodiment of the present disclosure, the information processing method further includes: when the quantity of UEs in the slice reaches a maximum value or the quantity of PDU sessions in the slice reaches a maximum value, starting a congestion control mechanism; or when an analysis result related to congestion control has been received from the NWDAF, starting the congestion control mechanism; or when the analysis result related to congestion control has been received from the NWDAF, transmitting a congestion control indicator to the PCF entity, the AMF entity, the NSSF entity or the NSQ entity.

In a possible embodiment of the present disclosure, the analysis result related to the congestion control further includes third timestamp information, and the third timestamp information is used to indicate a time when the quantity of UEs in the slice reaches the maximum value and/or a time when the quantity of PDU sessions in the slice reaches the maximum value. The starting the congestion control mechanism when the analysis result related to the congestion control has been received from the NWDAF includes, when the analysis result related to the congestion control has been received from the NWDAF, starting the congestion control mechanism at a time indicated through the third timestamp information. The transmitting the congestion control indicator to the PCF entity, the AMF entity, the NSSF entity or the NSQ entity when the analysis result related to the congestion control has been received from the NWDAF includes: when the analysis result related to the congestion control has been received from the NWDAF, transmitting the congestion control indicator to the PCF entity, the AMF entity, the NSSF entity or the NSQ entity at the time indicated through the third timestamp information; or when the analysis result related to the congestion control has been received from the NWDAF, transmitting the congestion control indicator and the third timestamp information to the PCF entity, the AMF entity, the NSSF entity or the NSQ entity.

In a possible embodiment of the present disclosure, the target network element is the AMF, and the starting the congestion control mechanism includes: when the quantity of UEs in the slice reaches the maximum value or the congestion control indicator has been received, transmitting an NGAP OVERLOAD START message to an RAN, the message including a slice identifier; and when the quantity of UEs in the slice is smaller than the maximum value, transmitting an NGAP OVERLOAD STOP message to the RAN, the message including the slice identifier.

In a possible embodiment of the present disclosure, the target network element is the PCF, NSSF or NSQ, and the starting the congestion control mechanism includes: when the quantity of UEs in the slice reaches the maximum value or the congestion control indicator has been received, transmitting a first notification message to the AMF, the first notification message being used to indicate that the quantity of UEs in the slice has reached the maximum value or S-NSSAI congestion occurs; and when the quantity of UEs in the slice is smaller than the maximum value, transmitting a second notification message to the AMF, the second notification message being used to indicate that the quantity of UEs in the slice has not reached the maximum value or an S-NSSAI congestion is stopped.

In a possible embodiment of the present disclosure, the target network element is the PCF, NSSF or NSQ, and the starting the congestion control mechanism includes: when the quantity of PDU sessions in the slice has reached the maximum value or the congestion control indicator has been received, transmitting a third notification message to the AMF or an SMF, the third notification message being used to indicate that the quantity of PDU sessions in the slice has reached the maximum value or an S-NSSAI SM congestion occurs; and when the quantity of PDU sessions in the slice is smaller than the maximum value, transmitting a fourth notification message to the AMF or SMF, the fourth notification message being used to indicate that the quantity of UEs in the slice has not reached the maximum value or an S-NSSAI congestion does not occur.

In a possible embodiment of the present disclosure, the target network element is the AMF, and the information processing method further includes transmitting an update request to an RF, and the update request includes a slice identifier, information of an AMF set or a slice coverage region, and at least one of the analysis result related to the quantity of UEs in the slice or the analysis result related to the quantity of PDU sessions in the slice.

In a third aspect, the present disclosure provides in some embodiments an information processing device for an NWDAF, including: a first obtaining module configured to obtain information of a slice; a first determination module configured to determine at least one of an analysis result related to the quantity of UEs in the slice or an analysis result related to the quantity of PDU sessions in the slice in accordance with the information of the slice; and a first transmission module configured to transmit at least one of the analysis result related to the quantity of UEs or the analysis result related to the quantity of PDU sessions to a target network element.

In a fourth aspect, the present disclosure provides in some embodiments an information processing device for a target network element, including a first reception module configured to receive at least one of an analysis result related to the quantity of UEs or an analysis result related to the quantity of PDU sessions from an NWDAF.

In a fifth aspect, the present disclosure provides in some embodiments an information processing apparatus for an NWDAF, including a transceiver, a memory, a processor, and a program stored in the memory and used to be executed by the processor. The processor is configured to read a program stored in the memory to: obtain information of a slice; determine at least one of an analysis result related to the quantity of UEs in the slice or an analysis result related to the quantity of PDU sessions in the slice in accordance with the information of the slice; and transmit at least one of the analysis result related to the quantity of UEs or the analysis result related to the quantity of PDU sessions to a target network element.

In a possible embodiment of the present disclosure, the information of the slice includes at least one of a slice rate obtained from an OAM or RAN node or a UPF, the average quantity of UEs or the peak quantity of UEs obtained from the target network element, the average quantity of PDU sessions or the peak quantity of PDU sessions obtained from the target network element, or an average slice rate or a peak slice rate obtained from the target network element.

In a possible embodiment of the present disclosure, the processor is further configured to read the program in the memory to: obtain region information; and transmit at least one of the analysis result related to the quantity of UEs or the analysis result related to the quantity of PDU sessions to the target network element in accordance with the region information, or determine the maximum quantity of UEs or the maximum quantity of PDU sessions of the slice in different regions in accordance with the region information and transmit the maximum quantity of UEs or the maximum quantity of PDU sessions to a network function in the region. The target network element is located in the region corresponding to the region information.

In a possible embodiment of the present disclosure, the region information includes information of an AMF set or a slice coverage region. The processor is further configured to read the program in the memory to: obtain information of the UE, the information of the UE including at least one of a service behavior of the UE, subscription information of the UE and a capability of the UE; and obtain at least one of the analysis result related to the quantity of UEs or the analysis result related to the quantity of PDU sessions in accordance with the slice rate, the information of the UE and statistical information of slice rates of the slice in different regions.

In a possible embodiment of the present disclosure, the processor is further configured to read the program in the memory, so as to determine an analysis result related to a backoff timer, and transmit the analysis result related to the backoff timer to the target network element.

In a possible embodiment of the present disclosure, the processor is further configured to read the program in the memory to: obtain first timestamp information and second timestamp information; and determine the analysis result related to the backoff timer in accordance with the first timestamp information and the second timestamp information. The first timestamp information is transmitted by an OAM or RAN node or a UPF when the OAM or RAN node or the UPF detects that the slice rate reaches a maximum value, and the second timestamp information is transmitted by the OAM or RAN node or the UPF when the OAM or RAN node or the UPF detects that the slice rate is smaller than the maximum value for the first time after the slice rate has reached the maximum value; or the first timestamp information is transmitted by the target network element when the target network element detects that the quantity of UEs reaches a maximum value, and the second timestamp information is transmitted by the target network element when the target network element detects that the quantity of UEs is smaller than the maximum value for a first time after the quantity of UEs has reached the maximum value; or the first timestamp information is transmitted by the target network element when the target network element detects that the quantity of PDU sessions has reached a maximum value, and the second timestamp information is transmitted by the target network element when the target network element detects that the quantity of PDU sessions is smaller than the maximum value for the first time after the quantity of PDU sessions has reached the maximum value.

In a possible embodiment of the present disclosure, the processor is further configured to read the program in the memory, so as to transmit an analysis result related to congestion control to the target network element.

In a possible embodiment of the present disclosure, the analysis result related to congestion control further includes third timestamp information, and the third timestamp information is used to indicate a time when the quantity of UEs in the slice reaches the maximum value and/or a time when the quantity of PDU sessions in the slice reaches the maximum value.

In a sixth aspect, the present disclosure provides in some embodiments an information processing apparatus for a target network element, including a transceiver, a memory, a processor, and a program stored in the memory and used to be executed by the processor. The processor is configured to read the program in the memory, so as to receive at least one of an analysis result related to the quantity of UEs or an analysis result related to the quantity of PDU sessions from an NWDAF.

In a possible embodiment of the present disclosure, the target network element includes a PCF, an AMF, an NSSF, or an NSQ.

In a possible embodiment of the present disclosure, the processor is further configured to read the program in the memory to: when the quantity of UEs in the slice reaches a maximum value or the quantity of PDU sessions in the slice reaches a maximum value, start a congestion control mechanism; or when an analysis result related to congestion control has been received from the NWDAF, start the congestion control mechanism.

In a possible embodiment of the present disclosure, the target network element is the AMF, and the processor is further configured to read the program in the memory to: when the quantity of UEs in the slice reaches the maximum value or the congestion control indicator has been received, transmit an NGAP OVERLOAD START message to an RAN, the message including a slice identifier; and when the quantity of UEs in the slice is smaller than the maximum value, transmit an NGAP OVERLOAD STOP message to the RAN, the message including the slice identifier.

In a possible embodiment of the present disclosure, the target network element is the PCF, NSSF or NSQ, and the processor is further configured to read the program in the memory to: when the quantity of UEs in the slice reaches the maximum value or the congestion control indicator has been received, transmit a first notification message to the AMF, the first notification message being used to indicate that the quantity of UEs in the slice has reached the maximum value or S-NSSAI congestion occurs; and when the quantity of UEs in the slice is smaller than the maximum value, transmit a second notification message to the AMF, the second notification message being used to indicate that the quantity of UEs in the slice has not reached the maximum value or an S-NSSAI congestion is stopped.

In a possible embodiment of the present disclosure, the target network element is the PCF, NSSF or NSQ, and the processor is further configured to read the program in the memory to: when the quantity of PDU sessions in the slice has reached the maximum value or the congestion control indicator has been received, transmit a third notification message to the AMF or an SMF, the third notification message being used to indicate that the quantity of PDU sessions in the slice has reached the maximum value or an S-NSSAI SM congestion occurs; and when the quantity of PDU sessions in the slice is smaller than the maximum value, transmit a fourth notification message to the AMF or SMF, the fourth notification message being used to indicate that the quantity of UEs in the slice has not reached the maximum value or an S-NSSAI congestion does not occur.

In a possible embodiment of the present disclosure, the target network element is the PCF, NSSF or NSQ, and the processor is further configured to read the program in the memory, so as to transmit an update request to an RF, and the update request includes a slice identifier, information of an AMF set or a slice coverage region, and at least one of the analysis result related to the quantity of UEs in the slice or the analysis result related to the quantity of PDU sessions in the slice.

In a seventh aspect, the present disclosure provides in some embodiments a readable storage medium storing therein a program. The program is executed by a processor so as to implement the steps of the information processing method in the first aspect, or the steps of the information processing method in the second aspect.

According to the embodiments of the present disclosure, at least one of the analysis result related to the quantity of UEs or the analysis result related to the quantity of PDU sessions is obtained in accordance with the information of the slice. As a result, it is able to flexibly adjust the quantity of UEs or the quantity of PDU sessions supported by the slice.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
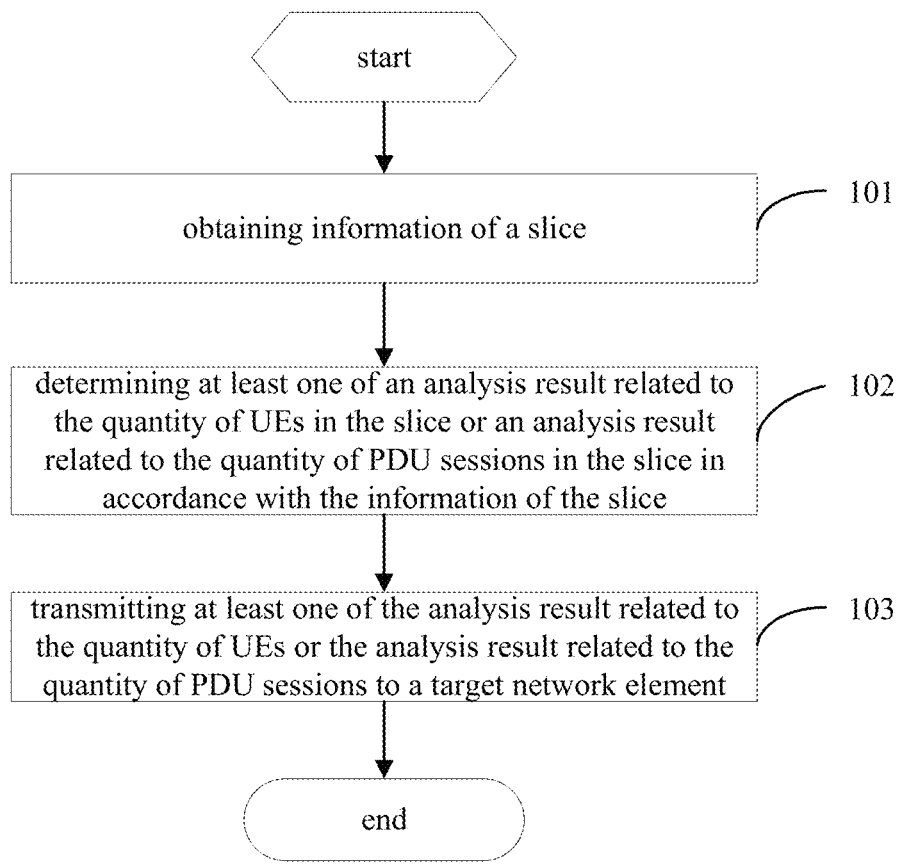
FIG. 1 is a flow chart of an information processing method according to an embodiment of the present disclosure.

As shown in FIG. 1, the present disclosure provides in some embodiments an information processing method for an NWDAF which includes the following steps.

Step 101: obtaining information of a slice.

In the embodiments of the present disclosure, the information of the slice includes a slice rate obtained from an OAM or RAN node or a UPF, the average quantity of UEs or the peak quantity of UEs obtained from a target network element, the average quantity of PDU sessions or the peak quantity of PDU sessions obtained from the target network element, or an average slice rate or a peak slice rate obtained from the target network element. The target network element may be a PCF, an AMF, an NSSF or an NSQ.

For example, the NWDAF subscribes to the OAM or RAN node or the UPF for the slice rate, so as to obtain the slice rate from the OAM or RAN node or the UPF.

For example, the target network element counts the quantity of UEs or PDU sessions within a certain time period, so as to obtain the average quantity of UEs or the peak quantity of UEs, and the average quantity of PDU sessions or the peak quantity of PDU sessions.

For example, when the target network element is the NSSF or NSQ, the target network element requests an AMF or an SMF to provide the average slice rate or the peak slice rate, the AMF requests the RAN to provides the average slice rate or the peak slice rate, and the SMF requests the UPF to provide the average slice rate or the peak slice rate. When the target network element is the AMF or SMF, it directly obtains the information. Hence, the target network element transmits the average slice rate rage or the peak slice rate to the NWDAF.

Within the AMF set or the slice coverage region, a certain AMF requests the other AMF to provide the average slice rate or the peak slice rate, and then provides the average slice rate or the peak slice rate for the set or region to the NWDAF. A certain SMF in the coverage region requests the other SMF to provide the average slice rate or peak slice rate, and then provides the average slice rate or peak slice rate for the set or region to the NWDAF. When the target network element is the AMF or SMF, it directly obtains the information and transmits it to the NWDAF. When the target element is the NSSF or NSQ, it requests the average slice rate or the peak slice rate from the AMF or SMF, and transmits it to the NWDAF.

Step 102: determining at least one of an analysis result related to the quantity of UEs in the slice or an analysis result related to the quantity of PDU sessions in the slice in accordance with the information of the slice.

The analysis result related to the quantity of UEs includes a range of the quantity of UEs, the maximum quantity of UEs, a range of the maximum quantity of UEs, a range of the quantity of UEs in a connected state, the maximum quantity of UEs in the connected state, a range of the quantity of UEs in an idle state, the maximum quantity of UEs in the idle state, the maximum quantity of UEs in a roaming state, a range of the maximum quantity of UEs in the roaming state, etc.

The analysis result related to the quantity of PDU sessions include a range of the quantity of PDU sessions, the maximum quantity of PDU sessions, a range of the maximum quantity of PDU sessions, a range of the quantity of PDU sessions in a deactivated state, the maximum quantity of PDU sessions in the deactivated state, a range of the quantity of PDU sessions in an activated state, the maximum quantity of PDU sessions in the activated state, etc.

In the embodiments of the present disclosure, the NWDAF determines the analysis result related to the quantity of UEs in the slice or the analysis result related to the quantity of PDU sessions in the slice through an algorithm in accordance with the information of the slice, and the algorithm may be selected according to the needs.

In the embodiments of the present disclosure, in order to improve the control accuracy, subsequent to Step 101, the information processing method further includes obtaining region information in accordance with the information of the slice. The region information includes information of the AMF set or the slice coverage region.

In the embodiments of the present disclosure, the NWDAF determines the analysis result related to the quantity of UEs in the slice or the analysis result related to the quantity of PDU sessions in the slice in any of the following ways.

In a first way, the NWDAF obtains information of the UE, and then determines the analysis result related to the quantity of UEs in the slice or the analysis result related to the quantity of PDU sessions in the slice in accordance with the slice rate, the information of the UE and statistical information of slice rates of the slice in different regions.

The information of the UE includes at least one of a service behavior of the UE, subscription information of the UE or a capability of the UE.

For example, the NWDAF may analyze the service behavior of the UE, the subscription information of the UE, the capability of the UE, and historical statistics about data rates of the slice in different regions, so as to determine the analysis result related to the quantity of UEs in the slice or the analysis result related to the quantity of PDU sessions in the slice. The capability of the UE may be a priority level of the UE, a mobility management capability of the UE, a session management capability of the UE, etc.

In a second way, the NWDAF obtains first information from the target network element at a certain time interval, obtains a first change trend in the target network element in accordance with the first information, and then obtains at least one of the analysis result related to the quantity of UEs or the analysis result related to the quantity of PDU sessions in accordance with the slice rate and the first change trend. The time interval may be set according to the practical need.

The first information is an average slice rate or a peak slice rate in the time interval, and the first change trend is a rate change trend; or the first information is the average quantity of UEs or the peak quantity of UEs in the time interval, and the first change trend is a change trend of the quantity of UEs; or the first information is the average quantity of PDU sessions or the peak quantity of PDU sessions in the time interval, and the first change trend is a change trend of the quantity of PDU sessions.

For example, the NWDAF requests each AMF in the AMF set or the slice coverage region to report the average/peak slice rate at a certain time interval, and stores data. The NWDAF then counts and analyzes the historical data to obtain a trend of the slice rate along with the time in different AMF sets or slice coverage regions, and determines the analysis result related to the quantity of UEs or PDU sessions in the slice, e.g., the analysis result related to the quantity of UEs or PDU sessions in the AMF set or the slice coverage region. The analysis result may be a range of the maximum quantity of UEs in the slice or a range of the maximum quantity of PDU sessions in the slice. For example, the NWDAF analyzes the slice rates in different AMF sets or slice coverage regions in 20:00 to 23:00 in accordance with the trend, and finds that a slice rate in 20:00 to 22:00 is 10 Mbps in an AMF set 1 or a slice coverage region 1 and a slice rate in 20:00 to 22:00 is 5 Mbps in an AMF set 2 or a slice coverage region 2. At this time, the analysis result related to the quantity of UEs in the slice determined by the NWDAF is that a range of the maximum quantity of UEs in the AMF set 1 or the slice coverage region 1 is 1000 to 1100 or a range of the maximum quantity of PDU sessions in the AMF set 1 or the slice coverage region 1 is 2000 to 2100, and a range of the maximum quantity of UEs in the AMF set 2 or the slice coverage region 2 is 500 to 510 or a range of the maximum quantity of PDU sessions in the AMF set 2 or the slice coverage region 2 is 1000 to 1050. The analysis result related to the quantity of UEs or PDU sessions in the slice determined by the NWDAF may also be a change trend of the quantity of UEs or PDU sessions in different AMF sets or slice coverage regions in 20:00 to 22:00. The NWDAF transmits the analysis result related to the quantity of UEs or PDU sessions in the slice to a quota configuration function (e.g., OAM, PCF, UDM or UDR) or an AMF in the AMF set or the slice coverage region. The quota configuration function determines a quota for the slice (e.g., the quantity of UEs or PDU sessions in the slice or the maximum quantity of UEs of PDU sessions in the slice) in different AMF sets or slice coverage regions in accordance with the analysis result, and transmits the quota for the slice to the AMFs in different AMF sets or slice coverage regions. When the NWDAF directly transmits the analysis result to the AMF in the AMF set or the slice coverage region, the AMF determines the quantity of UEs or PDU sessions in the slice or the maximum quantity of UEs or PDU sessions in the slice in a current AMF set or slice coverage region in accordance with the analysis result. In the embodiments of the present disclosure, the NWDAF may further transmit an identifier of the AMF set or slice overage region and a slice identifier to the quota configuration function. The quota configuration function may further transmit the slice identifier to the AMFs in different AMF sets or slice coverage regions.

For example, the NWDAF requests each AMF in the AMF set or slice coverage region to report the average/peak quantity of UEs of PDU sessions at a certain time interval, stores the data, counts and analyzes the historical data, and then determines the analysis result related to the quantity of UEs or PDU sessions in the slice, e.g., the change trend of the quantity of UEs or PDU sessions within a specific time period, the maximum quantity of UEs or PDU sessions, or the range of the maximum quantity of UEs or PDU sessions. For example, the NWDAF analyzes the quantity of UEs and PDU sessions in different AMF sets or slice coverage regions in 20:00 to 23:00 in accordance with the trend, and finds that the quantity of UEs is 200 and the quantity of PDU sessions is 300 in 20:00 to 22:00 in the AMF set 1 or the slice coverage region 1, and the quantity of UEs is 50 and the quantity of PDU sessions is 100 in 20:00 to 22:00 in the AMF set 2 or the slice coverage region 2. At this time, the analysis result related to the quantity of UEs in the AMF set 1 or the slice coverage region 1 determined by the NWDAF is that the maximum quantity of UEs is 210 and the maximum quantity of PDU sessions is 310, and the analysis result related to the quantity of UEs in the AMF set 2 or the slice coverage region 2 determined by the NWDAF is that the maximum quantity of UEs is 60 and the maximum quantity of PDU sessions is 120.

For example, the NWDAF requests a Network Function (NF) (e.g., AMF, SMF, PCF, NSQ, NSSF, UDM or OAM) to report the average/peak slice rate at a certain time interval, stores the data, counts and analyzes the historical data to obtain a change trend of the slice rates for different NFs along with time, determines the analysis results related to the quantity of UEs and PDU sessions in the slice, e.g., the range of the maximum quantity of UEs and the range of the maximum quantity of PDU sessions in the slice, and transmits the analysis results related to the quantity of UEs and the quantity of PDU sessions in the slice to the NF. The NF is a quota configuration function (e.g., UDM, UDR or OAM), or a NF for counting the quantity of UEs and the quantity of PDU sessions (e.g., PCF, SMF, AMF or NSSF). For example, the NWDAF analyses the slice rate for different NFs in 20:00 to 23:00 in accordance with the trend, and finds that a slice rate for an NF 1 in 20:00 to 22:00 is 10 Mbps and a slice rate for an NF 2 in 20:00 to 22:00 is 5 Mbps. The analysis results related to the quantity of UEs and the quantity PDU sessions in the slice determined by the NWDAF are that the maximum quantity of UEs supported by the NF 1 is 1000, the maximum quantity of PDU sessions supported by the NF 1 is 2000, the maximum quantity of UEs supported by the NF 2 is 500, and the maximum quantity of PDU sessions supported by the NF 2 is 1000.

For example, the NWDAF further requests the NF to report the average quantity of UEs or PDU sessions at a certain time interval, stores, counts and analyzes the historical data to obtain the change trend of the quantity of UEs or PDU sessions along with the time, and determines the analysis result related to the quantity of UEs or PDU sessions in the slice in accordance with the trend, e.g., the quantity of UEs or PDU sessions in the slice supported by the NF at different time points or within different time periods. For example, the NWDAF analyzes the quantity of UEs and PDU sessions for different NFs in 20:00 to 23:00 in accordance with the trend, finds that the quantity of UEs served by the NF 1 is 200 and the quantity of PDU sessions served by the NF 1 is 300 in 20:00 to 22:00, and the quantity of UEs served by the NF 2 is 50 and the quantity of PDU sessions served by the NF 2 is 100 in 20:00 to 22:00. At this time, the analysis result related to the quantity of UEs transmitted by the NWDAF to the NF 1 is the slice identifier, the maximum quantity of UEs (210) and the maximum quantity of PDU sessions (310), and the analysis result related to the quantity of UEs transmitted by the NWDAF to the NF 2 is the slice identifier, the maximum quantity of UEs (60) and the maximum quantity of PDU sessions (120).

Step 103: transmitting at least one of the analysis result related to the quantity of UEs or the analysis result related to the quantity of PDU sessions to the target network element.

According to the embodiments of the present disclosure, at least one of the analysis result related to the quantity of UEs and the analysis result related to the quantity of PDU sessions may be obtained in accordance with the information of the slice. As a result, it is able to flexibly adjust the quantity of UEs or PDU sessions supported by the slice.

Based on the above, the NWDAF may further determine an analysis result related to a backoff timer (e.g., a duration of the backoff timer), and transmits the analysis result related to the backoff timer to the NF.

To be specific, the NWDAF obtains first timestamp information and second timestamp information, and determines the analysis result related to the backoff timer in accordance with the first timestamp information and the second timestamp information. The first timestamp information is transmitted by an OAM or RAN node or a UPF when the OAM or RAN node or the UPF detects that the slice rate reaches a maximum value, and the second timestamp information is transmitted by the OAM or RAN node or the UPF when the OAM or RAN node or the UPF detects that the slice rate is smaller than the maximum value for the first time after the slice rate has reached the maximum value; or the first timestamp information is transmitted by the target network element when the target network element detects that the quantity of UEs reaches a maximum value, and the second timestamp information is transmitted by the target network element when the target network element detects that the quantity of UEs is smaller than the maximum value for a first time after the quantity of UEs has reached the maximum value; or the first timestamp information is transmitted by the target network element when the target network element detects that the quantity of PDU sessions has reached a maximum value, and the second timestamp information is transmitted by the target network element when the target network element detects that the quantity of PDU sessions is smaller than the maximum value for the first time after the quantity of PDU sessions has reached the maximum value.

Based on the above, the NWDAF further transmits an analysis result related to congestion control to the target network element. In a possible embodiment of the present disclosure, the analysis result related to congestion control further includes third timestamp information, and the third timestamp information is used to indicate a time when the quantity of UEs in the slice reaches the maximum value and/or a time when the quantity of PDU sessions in the slice reaches the maximum value.

Figure 2:
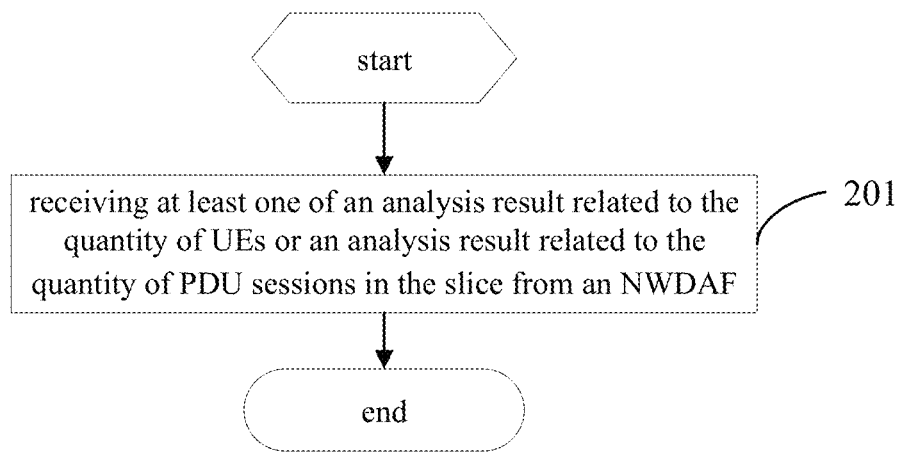
FIG. 2 is another flow chart of the information processing method according to an embodiment of the present disclosure.

As shown in FIG. 2, the present disclosure further provides in some embodiments an information processing method for a target network element, which includes Step 201 of receiving at least one of an analysis result related to the quantity of UEs or an analysis result related to the quantity of PDU sessions from an NWDAF.

For example, the target network element is a network function for counting the quantity of UEs and the quantity of PDU sessions, e.g., a PCF, an NSSF, an NSQ, an AMF or a quota configuration function.

The quota configuration function includes a UDM, a UDR, an OAM, an O&M or an NRF. At this time, the information processing method further includes determining the maximum quantity of UEs or the maximum quantity of PDU sessions in the slice, and transmitting the maximum quantity of UEs or the maximum quantity of PDU sessions to the PCF, the AMF, the NSSF or the NSQ.

The analysis result related to the quantity of UEs includes a range of the quantity of UEs, the maximum quantity of UEs, a range of the maximum quantity of UEs, a range of the quantity of UEs in a connected state, the maximum quantity of UEs in the connected state, a range of the quantity of UEs in an idle state, the maximum quantity of UEs in the idle state, the maximum quantity of UEs in a roaming state, a range of the maximum quantity of UEs in the roaming state, a change trend of the quantity of UEs, etc.

The analysis result related to the quantity of PDU sessions include a range of the quantity of PDU sessions, the maximum quantity of PDU sessions, a range of the maximum quantity of PDU sessions, a range of the quantity of PDU sessions in a deactivated state, the maximum quantity of PDU sessions in the deactivated state, a range of the quantity of PDU sessions in an activated state, the maximum quantity of PDU sessions in the activated state, a change trend of the quantity of PDU sessions, etc.

When the quantity of UEs in the slice reaches a maximum value or the quantity of PDU sessions in the slice reaches a maximum value, a congestion control mechanism is started. Alternatively, when an analysis result related to congestion control has been received from the NWDAF, the congestion control mechanism is started. Alternatively, when the analysis result related to congestion control has been received from the NWDAF, a congestion control indicator is transmitted to the PCF, the AMF, the NSSF or the NSQ.

The analysis result related to the congestion control further includes third timestamp information, and the third timestamp information is used to indicate a time when the quantity of UEs in the slice reaches the maximum value and/or a time when the quantity of PDU sessions in the slice reaches the maximum value. At this time, when the analysis result related to the congestion control has been received from the NWDAF, the congestion control mechanism is started at the time indicated through the third timestamp information.

The transmitting the congestion control indicator to the PCF, the AMF, the NSSF or the NSQ when the analysis result related to the congestion control has been received from the NWDAF includes: when the analysis result related to the congestion control has been received from the NWDAF, transmitting the congestion control indicator to the PCF, the AMF, the NSSF or the NSQ at the time indicated through the third timestamp information; or when the analysis result related to the congestion control has been received from the NWDAF, transmitting the congestion control indicator and the third timestamp information to the PCF, the AMF, the NSSF or the NSQ.

In a possible embodiment of the present disclosure, the target network element is the AMF. At this time, when the quantity of UEs in the slice reaches the maximum value or the congestion control indicator has been received, the AMF transmits an NGAP OVERLOAD START message to an RAN, and the message includes a slice identifier. When the quantity of UEs in the slice is smaller than the maximum value, the AMF transmits an NGAP OVERLOAD STOP message to the RAN, and the message includes the slice identifier.

In a possible embodiment of the present disclosure, the target network element is the PCF, the NSSF, the NSQ, the OAM, the UDM or the UDR. At this time, when the quantity of UEs in the slice reaches the maximum value or the congestion control indicator has been received, the PCF, the NSSF, the NSQ, the OAM, the UDM or the UDR transmits a first notification message to the AMF, and the first notification message is used to indicate that the quantity of UEs in the slice has reached the maximum value or an S-NSSAI congestion occurs. When the quantity of UEs in the slice is smaller than the maximum value, the PCF, the NSSF, the NSQ, the OAM, the UDM or the UDR transmits a second notification message to the AMF, the second notification message being used to indicate that the quantity of UEs in the slices has not reached the maximum value or the S-NSSAI congestion is stopped.

In a possible embodiment of the present disclosure, the target network element is the PCF, the NSSF, the NSQ, the OAM, the UDM or the UDR. At this time, when the quantity of PDU sessions in the slice has reached the maximum value or the congestion control indicator has been received, the PCF, the NSSF, the NSQ, the OAM, the UDM or the UDR transmits a third notification message to the AMF or an SMF, and the third notification message is used to indicate that the quantity of PDU sessions in the slice has reached the maximum value or an S-NSSAI SM congestion occurs. When the quantity of PDU sessions in the slice is smaller than the maximum value, the PCF, the NSSF, the NSQ, the OAM, the UDM or the UDR transmits a fourth notification message to the AMF or SMF, and the fourth notification message is used to indicate that the quantity of UEs in the slice has not reached the maximum value or the S-NSSAI congestion does not occur.

In addition, when the target network element is the AMF, the information processing method further includes transmitting an update request to an RF, and the update request includes a slice identifier, information of an AMF set or a slice coverage region, and at least one of the analysis result related to the quantity of UEs in the slice or the analysis result related to the quantity of PDU sessions in the slice.

According to the embodiments of the present disclosure, at least one of the analysis result related to the quantity of UEs and the analysis result related to the quantity of PDU sessions is obtained in accordance with the information of the slice. As a result, it is able to flexibly adjust the quantity of UEs or PDU sessions supported by the slice.

Figure 3:
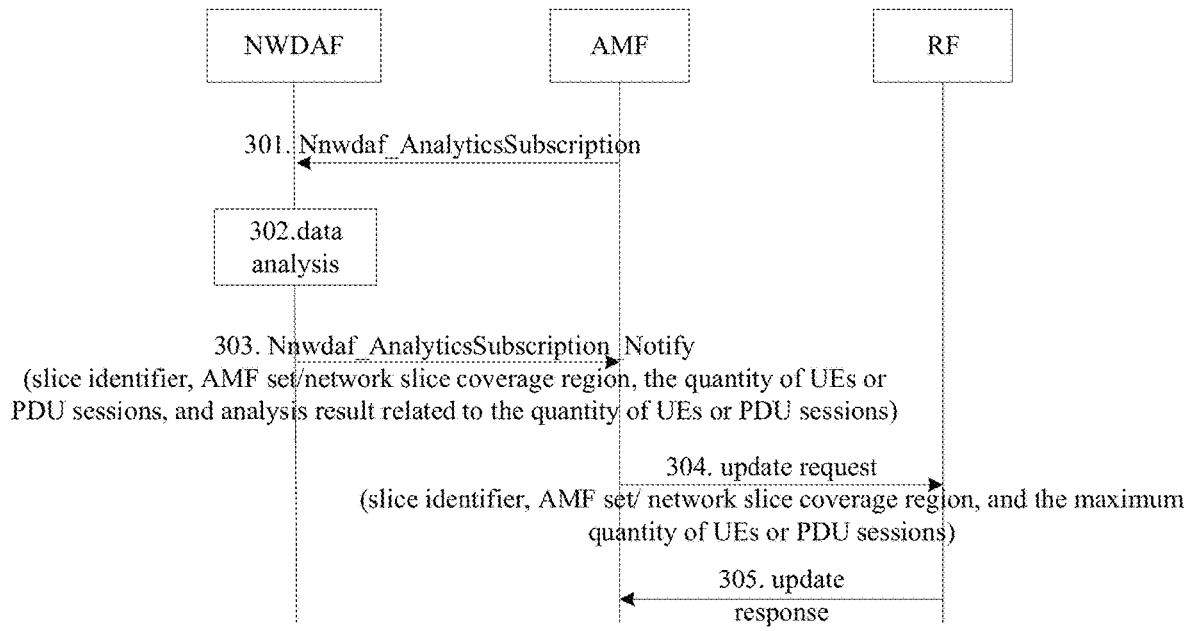
FIG. 3 is a flow chart of an information processing method according to an embodiment of the present disclosure.

FIG. 3 is a flow chart of the information processing method according to an embodiment of the present disclosure. In the embodiments of the present disclosure, the analysis result of the NWDAF includes the AMF set or the slice coverage region. As shown in FIG. 3, the information processing method includes the following steps.

Step 301: the AMF transmits a request message (Nnwdaf_AnalyticsSubscription) to the NWDAF, and a message parameter includes the slice identifier, the quantity of UEs or PDU sessions in the slice, or the slice rate.

When the AMF fails to provide any slice identifier, it means that the AMF requests the NWDAF to analyze the slice rate, the quantity of UEs or the quantity of PDU sessions in all the slices supported by the network. The AMF may also provide the AMF set or slice coverage region in the message.

Step 302: the NWDAF analyzes the data.

Step 303: the NWDAF determines the analysis result related to the quantity of UEs or PDU sessions, and returns a notification (Nnwdaf_AnalyticsSubscription Notify) to the AMF. The notification includes the slice identifier, the AMF set/slice coverage region, and the analysis result related to the quantity of UEs or PDU sessions.

The NWDAF requests each AMF in the AMF set/slice coverage region to report at a certain time interval the average/peak slice rate during that period, and stores such data.

The NWDAF counts and analyzes the historical data, determines a change trend of the slice rates in different AMF sets or slice coverage regions along with the time, and determines the analysis results related to the quantity of UEs and the quantity of PDU sessions in the slice in the AMF sets/slice coverage regions, e.g., the range of the maximum quantity of UEs and the range of the maximum quantity of PDU sessions in different slices.

For example, the NWDAF analyzes the slice rates in different AMF sets or slice coverage regions in 20:00 to 23:00 in accordance with the trend, and finds that a slice rate in 20:00 to 22:00 is 10 Mbps in an AMF set 1 or a slice coverage region 1 and a slice rate in 20:00 to 22:00 is 5 Mbps in an AMF set 2 or a slice coverage region 2. At this time, the analysis result related to the quantity of UEs in the AMF set 1 or the slice coverage region 1 determined by the NWDAF is that the maximum quantity of UEs is 1000 or the range of the maximum quantity of UEs is 1000 to 1050, the analysis result related to the quantity of PDU sessions in the AMF set 1 or the slice coverage region 1 is that the maximum quantity of PDU sessions is 200 or the range of the maximum quantity of PDU sessions is 2000 to 2100, the analysis result related to the quantity of UEs in the AMF set 2 or the slice coverage region 2 is that the maximum quantity of UEs is 500 or the range of the maximum quantity of UEs is 500 to 550, and the analysis result related to the quantity of PDU sessions in the AMF set 2 or the slice coverage region 2 is that the maximum quantity of PDU sessions is 1000 or the range of the maximum quantity of PDU sessions is 1000 to 1100.

The NWDAF may further request each AMF in the AMF set or slice coverage region to report the average/peak quantity of UEs or PDU sessions at a certain time interval, store the data, count and analyze the historical data, determine the analysis result related to the quantity of UEs or PDU sessions, e.g., the change trend of the quantity of UEs or PDU sessions along with the time, and transmit the analysis result to the AMF or the quota configuration function in the AMF set or the slice coverage region.

For example, the AMF or the quota configuration function finds, in accordance with the above-mentioned analysis result, e.g., the change trends of the quantity of UEs and PDU sessions in different AMF sets or slice coverage regions in 20:00 to 23:00, that the quantity of UEs served by the AMF set 1 or the slice coverage region 1 in 20:00 to 22:00 is 200 to 250, the quantity of PDU sessions is 300 to 350, the quantity of UEs served by the AMF set 2 or the slice coverage region 2 in 20:00 to 22:00 is 50 to 100, and the quantity of PDU sessions is 100 to 150. At this time, the AMF or the quota configuration function determines that the maximum quantity of UEs in the AMF set 1 or the slice coverage region 1 is 210, the maximum quantity of PDU sessions in the AMF set 1 or the slice coverage region 1 is 310, the maximum quantity of UEs in the AMF set 2 or the slice coverage region 2 is 60, and the maximum quantity of PDU sessions in the AMF set 2 or the slice coverage region 2 is 120.

Step 304: the AMF transmits an update request to the RF, and the update request includes the slice identifier, the AMF set/slice coverage region, and the maximum quantity of EUs or the maximum quantity of PDU sessions.

In the embodiments of the present disclosure, the RF is an Unstructured Data Storage Function (UDSF), a UDM or a UDR (Unified Data Repository). The quota configuration function is an OAM, a UDM or a UDR.

Step 305: the RF updates the information and returns an update response to the AMF.

Figure 4:
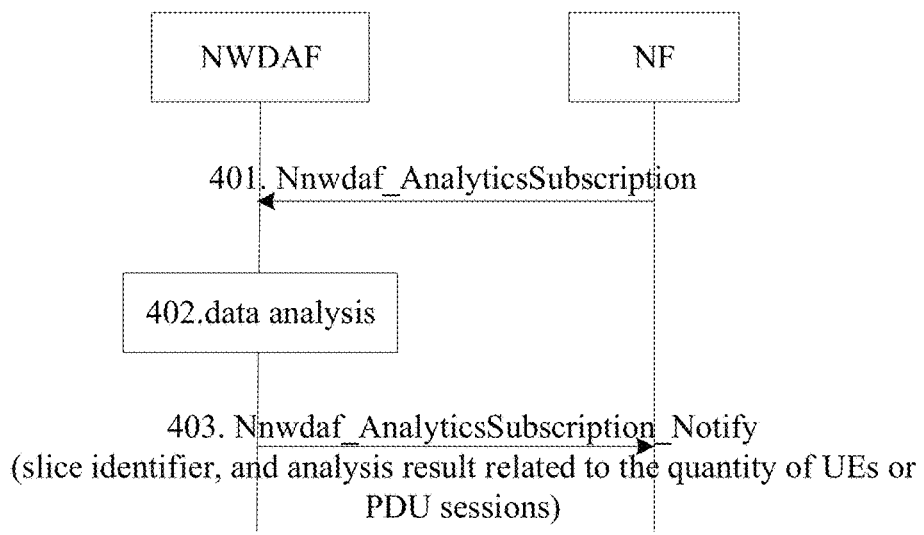
FIG. 4 is another flow chart of the information processing method according to an embodiment of the present disclosure.

FIG. 4 is a flow chart of the information processing method according to an embodiment of the present disclosure. In the embodiments of the present disclosure, the analysis result of the NWDAF includes an NF identifier. As shown in FIG. 4, the information processing method includes the following steps.

Step 401: the NF transmits a request message (Nnwdaf_AnalyticsSubscription) to the NWDAF, and a message parameter includes the slice identifier, the quantity of UEs in the slice, the quantity of PDU sessions in the slice, or the slice rate. When the NF fails to provide any slice identifier, it means that the NF requests the NWDAF to analyze the slice rate, the quantity of UEs or the quantity of PDU sessions in all the slices supported by the network. The AMF may also provide the AMF set or slice coverage region in the message. The NF is an AMF, a PCF, an NSSF, an NSQ or an RF.

Step 402: the NWDAF analyzes the data.

Step 403: the NWDAF determines the analysis result related to the quantity of UEs or PDU sessions in the slice, and returns a notification (Nnwdaf_AnalyticsSubscription Notify) to the NF. The notification includes the slice identifier, the AMF set/slice coverage region, and the analysis result related to the quantity of UEs or PDU sessions.

For example, the NWDAF requests the NF to report the average/peak slice rate at a certain time interval, and stores the data. The NWDAF counts and analyzes the historical data, determines the analysis results related to the slice rates for different NFs, e.g., a change trend of the slice rate along with the time, a maximum value of the slice rate, a time whether the slice rate reaches the maximum value or a time range, and determines the analysis results related to the quantity of UEs and the quantity of PDU sessions in the slices. For example, when the NWDAF analyzes the slice rates for different NFs in 20:00 to 23:00 in accordance with the trend and finds that the slice rate for an NF 1 in 20:00 to 22:00 is 10 Mbps and the slice rate for an NF 2 in 20:00 to 22:00 is 5 Mbps, the NWDAF determines the analysis result related to the quantity of UEs, e.g., the range of the maximum quantity of UEs (1000 to 1050) or the change trend of the quantity of UEs along with the time, determines the analysis result related to the quantity of PDU sessions, e.g., the maximum quantity of PDU sessions (1000 to 1050) or the change trend of the quantity of PDU sessions along with the time, and transmits the analysis results to the NF. The NF determines a quota assignment method in accordance with the analysis results, e.g., the maximum quantity of UEs assigned for the NF 1 is 1000, the maximum quantity of PDU sessions assigned for the NF 1 is 2000, the maximum quantity of UEs assigned for the NF 2 is 500, and the maximum quantity of PDU sessions assigned for the NF 2 is 1000.

For example, the NWDAF may further request the NF to report the average quantity of UEs or PDU sessions at a certain time interval, store the historical data, count and analyze the historical data to obtain the change trend of the quantity of UEs or PDU sessions along with the time, and determine the analysis results related to the quantity of UEs and PDU sessions in the slice in accordance with the trend, e.g., the ranges of the quantity of UEs or PDU sessions in the slice supported by the NF at different time points or within different time periods. For example, when the NWDAF analyzes the quantity of UEs and the quantity of PDU sessions for different NFs in 20:00 to 23:00 in accordance with the trend and finds that the quantity of UEs served by the NF 1 is 200 and the quantity of PDU sessions served by the NF 1 is 300 in 20:00 to 22:00 and the quantity of UEs served by the NF 2 is 50 and the quantity of PDU sessions served by the NF 2 is 100 in 20:00 to 22:00, the NWDAF determines that the maximum quantity of UEs is 210 and the maximum quantity of PDU sessions is 310 for the NF 1, and then transmits the analysis results to the NF 1. The NWDAF determines that the maximum quantity of UEs is 6 and the maximum quantity of PDU sessions is 120 for the NF 2.

Figure 5:
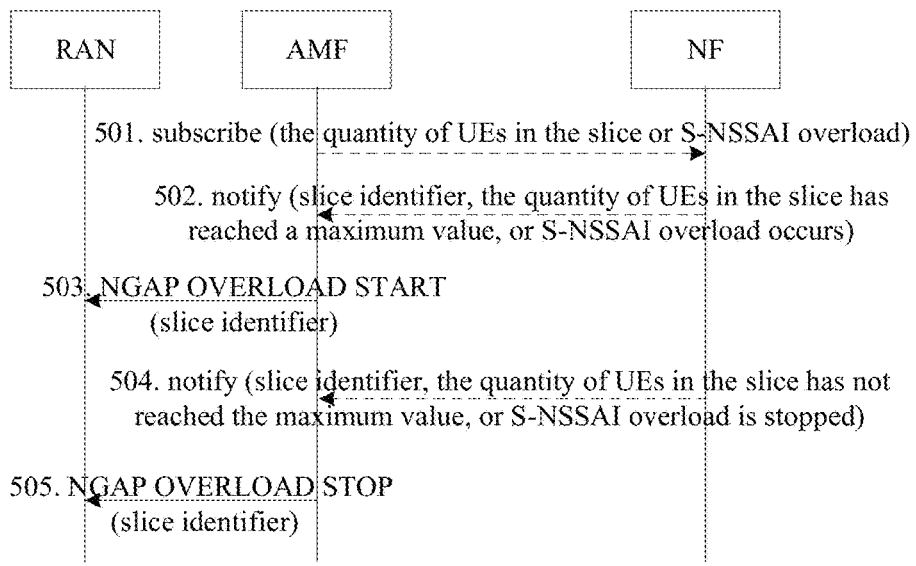
FIG. 5 is a flow chart of an information processing method according to an embodiment of the present disclosure.

FIG. 5 is a flow chart of the information processing method according to an embodiment of the present disclosure. In the embodiments of the present disclosure, when the NF finds that the quantity of UEs in the slice has reached the quantity of UEs provided by the NWDAF and supported by the slice, the NF controls the quantity of UEs in the slice through an AMF overload mechanism. The NF may be an AMF, a PCF, an NSSF, an NSQ or an RE. As shown in FIG. 5, the information processing method includes the following steps.

Step 501: the AMF subscribes to the NF an event where the quantity of UEs reaches the maximum value or an S-NSSAI congestion event. This step is optional, and when the NF is the AMF, it is unnecessary to perform this step.

Step 502: when the NF finds that the quantity of UEs in the slice has reached the maximum value, the NF transmits a notification to the AMF, and the notification includes the slice identifier, and an indicator indicating that the quantity of UEs in the slice has reached the maximum value or the S-NSSAI overload occurs.

Step 503: the AMF transmits an NGAP OVERLOAD START message to an RAN, and the message includes the slice identifier.

Step 504: when the NF finds that the quantity of UEs in the slice is smaller than the maximum value, the NF transmits a notification to the AMF, and the notification includes the slice identifier, and an indicator indicating that the quantity of UEs in the slice has not reached the maximum value or the S-NSSAI overload is stopped.

Step 505: the AMF transmits an NGAP OVERLOAD STOP message to the RAN, and the message includes the slice identifier.

Figure 6:
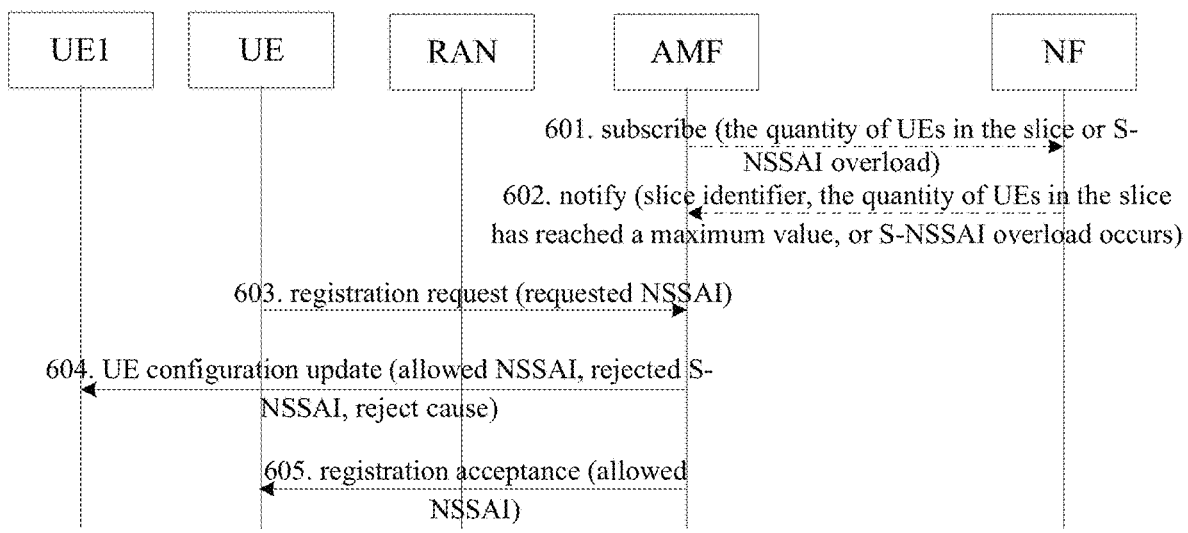
FIG. 6 is another flow chart of the information processing method according to an embodiment of the present disclosure.

In the above procedure, when the AMF finds that the quantity of UEs in the slice has reached the maximum value and the requested NSSAI received by the AMF includes the S-NSSAI of the slice, the AMF removes a UE with a low priority level from the slice in accordance with priority information of the UEs in locally-stored UE context, i.e., deletes the S-NSSAI from allowed NSSAI of the UE with the low priority level, then transmits UE configuration update message including updated allowed NSSAI to the UE with the low priority level, and then returns allowed NSSAI including the S-NSSAI of the slice to a UE with a high priority level. Subscription information obtained by the AMF from the UDM includes priority levels of the UEs. The NF is an AMF, a PCF, an NSSF, an NSQ, an RF or a quota configuration function. As shown in FIG. 6, the information processing method includes the following steps.

Step 601: the AMF subscribes to the NF an event where the quantity of UEs reaches the maximum value or an S-NSSAI congestion event. This step is optional, and when the NF is the AMF, it is unnecessary to perform this step.

Step 602: when the NF finds that the quantity of UEs in the slice has reached the maximum value, the NF transmits a notification to the AMF, and the notification includes the slice identifier, and an indicator indicating that the quantity of UEs in the slice has reached the maximum value or the S-NSSAI overload occurs.

Step 603: the UE transmits a registration request to the AMF, and the requested NSSAI in the message includes the S-NSSAI of the slice.

Step 604: when the AMF finds that a priority level of a UE 1 is lower than that of the UE, or the priority level of the UE 1 is lower than that of the UE and a PDU session with the slice has not been established by the UE 1, or the priority level of the UE 1 is lower than that of the UE and a user plane connection for each PDU session with the slice is deactivated, the AMF transmits a UE configuration update message to the UE 1, and the message includes the allowed NSSAI (without the S-NSSAI of the slice), rejected S-NSSAI (i.e., the S-NSSAI of the slice), and a reject cause (indicating that the quantity of UEs in the slice has reached the maximum value).

Step 605: the AMF transmits a registration acceptance message to the UE, and the allowed NSSAI in the message includes the S-NSSAI of the slice.

When there is no UE that meeting the condition in Step 604, the AMF may not perform Step 604 but return a registration reject message to the UE in Step 605, and the message includes the rejected S-NSSAI (the S-NSSAI of the slice) and the reject cause (indicating that the quantity of UEs in the slice has reached the maximum value).

When the quantity of UEs in the slice is smaller than the maximum value, e.g., when a part of UEs do not use the slice or the NWDAF has updated the maximum quantity of UEs or reduced a duration of the backoff timer, the NF transmits a notification to the AMF/SMF, and the notification includes the slice identifier, and an indicator indicating that the quantity of UEs in the slice has not reached the maximum value or the S-NSSAI congestion does not occur.

Figure 7:
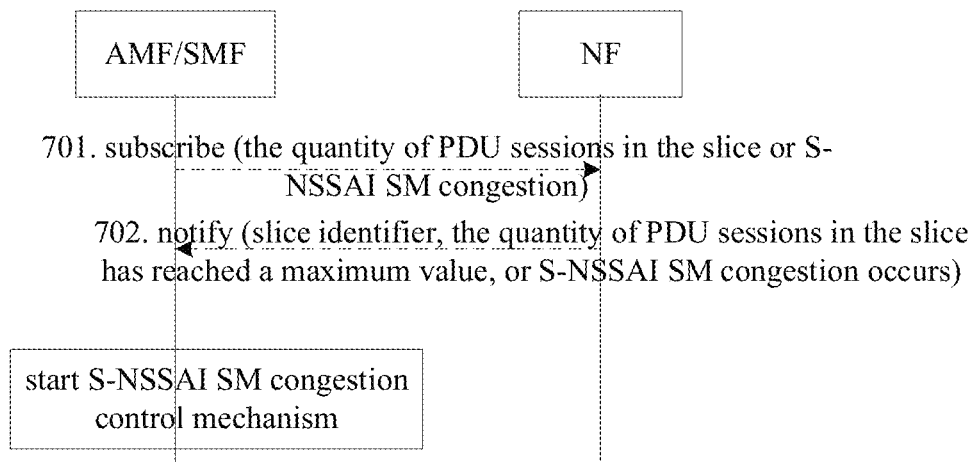
FIG. 7 is a flow chart of an information processing method according to an embodiment of the present disclosure.

FIG. 7 is a flow chart of the information processing method according to an embodiment of the present disclosure. In the embodiments of the present disclosure, when the NF finds that the quantity of PDU sessions in the slice has reached the quantity of PDU sessions provided by the NWDAF and supported by the slice, the NF controls the quantity of PDU sessions in the slice through a Non-Access Stratum (NAS) level congestion control mechanism. As shown in FIG. 7, the information processing method includes the following steps.

Step 701: the AMF/SMF subscribes to the NF an event where the quantity of PDU sessions reaches the maximum value or an S-NSSAI SM congestion event. This step is optional, and when the NF is the AMF/SMF, it is unnecessary to perform this step.

Step 702: when the NF finds that the quantity of PDU sessions in the slice has reached the maximum value, the NF transmits a notification to the AMF/SMF, and the notification includes the slice identifier, and an indicator indicating that the quantity of PDU sessions in the slice has reached the maximum value or the S-NSSAI SM congestion occurs. The AMF/SMF starts an S-NSSAI SM congestion control mechanism.

When the quantity of PDU sessions in the slice is smaller than the maximum value, e.g., when a part of PDU sessions in the slice have been released or the NWDAF has updated the maximum quantity of PDU sessions or reduced the duration of the backoff timer, the NF transmits a notification to the AMF/SMF, and the notification includes the slice identifier, and an indicator indicating that the quantity of PDU sessions in the slice has not reached the maximum value or the S-NSSAI SM congestion does not occur.

In the embodiments of the present disclosure, the NWDAF determines the analysis result related to the quantity of UEs in the slice, the analysis result related to the quantity of PDU sessions in the slice, and the analysis result related to the backoff timer.

The NWDAF analyses a service behavior of the UE, subscription information of the UE, a capability of the UE, and historical statistics about data rates of the slice in different regions, so as to obtain the quantity of UEs and the quantity of PDU sessions in the slice. The capability of the UE includes a priority level of the UE, a mobility management capability of the UE, a session management capability of the UE, etc.

In order to determine the analysis result related to the backoff timer, the NWDAF obtains the region, the historical quantity of UEs or PDU sessions (e.g., the NWDAF requests the NF to report the average/peak quantity of UEs or PDU sessions at a certain time interval) and timestamps (e.g., a time when the quantity of UEs or PDU sessions reaches the maximum value, and a time when the quantity of UEs or PDU sessions is smaller than the maximum value for the first time after it has reached the maximum value) from the NF for counting the quantity of UEs or PDU sessions, and analyzes the change trend of the quantity of UEs or PDU sessions in the region.

The NWDAF determines the analysis result related to the backoff timer, e.g., the duration, in accordance with the change trend and the timestamps. Alternatively, the NWDAF transmits the change trend and the timestamp information to the NF for counting the quantity of UEs or PDU sessions, so that the NF calculates the duration of the backoff timer in accordance with the change trend and the timestamp information and transmits the duration of the backoff timer to the AMF/SMF.

The NWDAF requests the NF to report the average/peak slice rate, a timestamp when the slice rate reaches a maximum value and a timestamp when the slice rate is smaller than the maximum value after it has reached the maxim value at a certain time interval, and stores the data.

The NWDAF counts and analyzes the historical data to obtain the change trend of the slice rate for different NFs along with the time, and determines the analysis result related to the backoff timer when the slice rate has reached the maximum value. For example, when the NWDAF determines that a slice rate for the NF 1 will reach the maximum value in 20:00 to 20:30 in accordance with the change trend and a congestion of 10 minutes will occur, the NWDAF determines the analysis result related to the backoff timer, e.g., the duration of the backoff timer (10 minutes), and provides the analysis result related to the backoff timer to the NF 1 at 20:00. When the congestion occurs, the NF 1 uses the duration of the backoff timer, and transmits a notification to the NWDAF. The NWDAF requests the OAM to monitor the traffic in the slice generated by the NF 1 within 5 minutes. When the traffic decreases, the NWDAF determines the analysis result related to the backoff timer, e.g., the duration of the backoff timer (5 minutes), and transmits it to the NF 1. When the slice traffic increases continuously, the NWDAF determines the analysis result related to the backoff timer, e.g., the duration of the backoff timer (15 minutes), and transmits it to the NF 1.

The NWDAF may further request the NF to report the average quantity of UEs or PDU sessions at a certain time interval, a timestamp when the quantity of UEs or PDU sessions reaches the maximum value and a timestamp when the quantity of UEs or PDU sessions is smaller than the maximum value for the first time after it has reached the maximum value, store the historical data, count and analyze the historical data, and determine the change trend of the quantity of UEs or PDU sessions along with the time.

The NWDAF determines the analysis results related to the quantity of UEs or PDU sessions in the slice at different time points or within different time periods in accordance with the trend, and determines the analysis result related to the backoff timer when the quantity of UEs or PDU sessions reaches the maximum value. For example, when the NWDAF determines the analysis result related to the quantity of UEs or PDU sessions and the analysis result related to the backoff timer in 20:00 to 20:30 in accordance with the trend, e.g., when the quantity of UEs or PDU sessions in the slice will reach the maximum value at 20:30 and a congestion of 10 minutes will occur, the analysis result related to the backoff timer and provided by the NWDAF to the NF 1 at 20:00 is that the duration is 10 minutes. The NF determines the duration of the backoff timer in accordance with the analysis result from the NWDAF, and provides it to the AMF or SMF. The NF is an UDM/UDR, an OAM, an O&M or an NRF.

In a possible embodiment of the present disclosure, the NWDAF transmits the analysis results related to the quantity of UEs and PDU sessions to the UDM/UDR, OAM, O&M or NRF. The UDM/UDR, OAM, O&M or NRF assigns the quantity of PDU sessions and UEs between different second network elements in accordance with the analysis results, e.g., the maximum quantity of PDU sessions and maximum quantity of UEs, and notifies an assignment result to the second network element. The NWDAF transmits the analysis result related to the duration of the backoff timer or the analysis result related to the congestion control to the UDM/UDR, OAM, O&M or NRF. The UDM/UDR, OAM, O&M or NRF determines the duration of the backoff timer or determines to transmit the congestion control indicator to the second network element in accordance with the analysis result, and then transmits the duration of the backoff timer or the congestion control indicator to the second target network element.

The second network element is a PCF, an AMF, an SMF, an NSSF, an NSQ or an NRF.

The analysis result related to the backoff timer is a time range where the timer is started, a range of the duration of the backoff timer, a time range where the congestion is ended, etc. The analysis result related to the congestion control is the congestion control indicator, a time range where the congestion occurs, a time range where the congestion is ended, etc.

Figure 8:
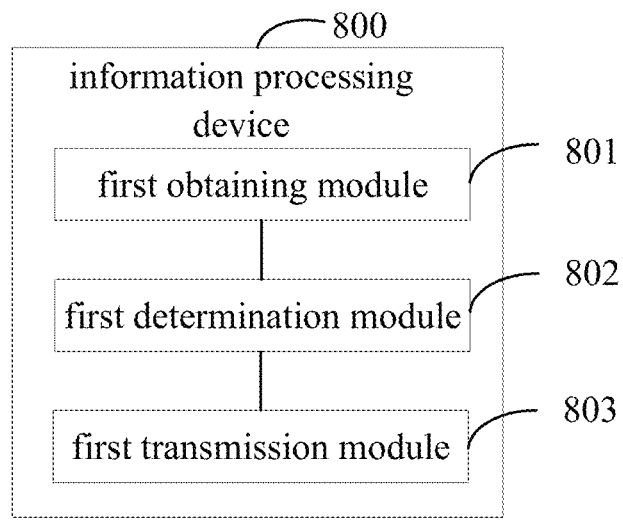
FIG. 8 is a schematic view showing an information processing device according to an embodiment of the present disclosure.

The present disclosure further provides in some embodiments an information processing device for an NWDAF, as shown in FIG. 8. A principle of the information processing device for solving the problem is similar to that of the information processing method, so the implementation of the information processing device may refer to that of the information processing method, which will not be particularly defined herein.

As shown in FIG. 8, the information processing device 800 includes: a first obtaining module 801 configured to obtain information of a slice; a first determination module 802 configured to determine at least one of an analysis result related to the quantity of UEs in the slice or an analysis result related to the quantity of PDU sessions in the slice in accordance with the information of the slice; and a first transmission module 803 configured to transmit at least one of the analysis result related to the quantity of UEs or the analysis result related to the quantity of PDU sessions to a target network element.

In a possible embodiment of the present disclosure, the information of the slice includes at least one of a slice rate obtained from an OAM or RAN node or a UPF, the average quantity of UEs or the peak quantity of UEs obtained from the target network element, the average quantity of PDU sessions or the peak quantity of PDU sessions obtained from the target network element, or an average slice rate or a peak slice rate obtained from the target network element.

In a possible embodiment of the present disclosure, the information processing device further includes a third obtaining module configured to obtain region information. The first transmission module is specifically configured to: transmit at least one of the analysis result related to the quantity of UEs or the analysis result related to the quantity of PDU sessions to the target network element in accordance with the region information, or determine the maximum quantity of UEs or the maximum quantity of PDU sessions of the slice in different regions in accordance with the region information and transmit the maximum quantity of UEs or the maximum quantity of PDU sessions to a network function in the region. The target network element is located in the region corresponding to the region information.

In a possible embodiment of the present disclosure, the region information includes information of an AMF set or a slice coverage region. The first transmission module includes: a first obtaining sub-module configured to obtain information of the UE, the information of the UE including at least one of a service behavior of the UE, subscription information of the UE and a capability of the UE; and a second obtaining sub-module configured to obtain at least one of the analysis result related to the quantity of UEs or the analysis result related to the quantity of PDU sessions in accordance with the slice rate, the information of the UE and statistical information of slice rates of the slice in different regions.

In a possible embodiment of the present disclosure, the information processing device further includes a determination module configured to determine an analysis result related to a backoff timer, and transmit the analysis result related to the backoff timer to the target network element.

In a possible embodiment of the present disclosure, the determination module includes: a first obtaining sub-module configured to obtain first timestamp information and second timestamp information; and a first determination sub-module configured to determine the analysis result related to the backoff timer in accordance with the first timestamp information and the second timestamp information. The first timestamp information is transmitted by an OAM or RAN node or a UPF when the OAM or RAN node or the UPF detects that the slice rate reaches a maximum value, and the second timestamp information is transmitted by the OAM or RAN node or the UPF when the OAM or RAN node or the UPF detects that the slice rate is smaller than the maximum value for the first time after the slice rate has reached the maximum value; or the first timestamp information is transmitted by the target network element when the target network element detects that the quantity of UEs reaches a maximum value, and the second timestamp information is transmitted by the target network element when the target network element detects that the quantity of UEs is smaller than the maximum value for a first time after the quantity of UEs has reached the maximum value; or the first timestamp information is transmitted by the target network element when the target network element detects that the quantity of PDU sessions has reached a maximum value, and the second timestamp information is transmitted by the target network element when the target network element detects that the quantity of PDU sessions is smaller than the maximum value for the first time after the quantity of PDU sessions has reached the maximum value.

In a possible embodiment of the present disclosure, the information processing device further includes a second transmission module configured to transmit an analysis result related to congestion control to the target network element. The analysis result related to congestion control further includes third timestamp information, and the third timestamp information is used to indicate a time when the quantity of UEs in the slice reaches the maximum value and/or a time when the quantity of PDU sessions in the slice reaches the maximum value.

The information processing device in the embodiments of the present disclosure is used to perform the above-mentioned information processing method with a similar principle and a similar technical effect, which will not be particularly defined herein.

Figure 9:
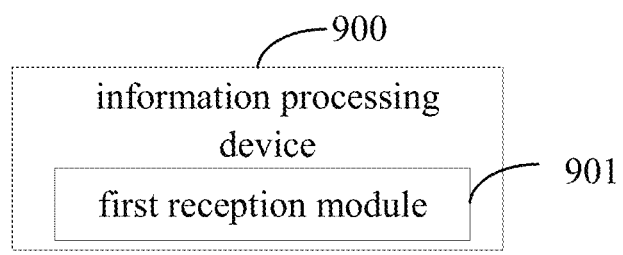
FIG. 9 is another schematic view showing the information processing device according to an embodiment of the present disclosure.

The present disclosure further provides in some embodiments an information processing device for a target network element, as shown in FIG. 9. A principle of the information processing device for solving the problem is similar to that of the information processing method, so the implementation of the information processing device may refer to that of the information processing method, which will not be particularly defined herein.

As shown in FIG. 9, the information processing device 900 includes a first reception module 901 configured to receive at least one of an analysis result related to the quantity of UEs or an analysis result related to the quantity of PDU sessions from an NWDAF.

In a possible embodiment of the present disclosure, the target network element includes a PCF, an AMF, an NSSF, an NSQ, or a quota configuration function.

In a possible embodiment of the present disclosure, the information processing device is applied to the quota configuration function, and it further includes a determination module configured to determine the maximum quantity of UEs or the maximum quantity of PDU sessions in the slice, and transmit the maximum quantity of UEs or the maximum quantity of PDU sessions to a PCF, an AMF, an SSF or an NSQ.

In a possible embodiment of the present disclosure, the information processing device further includes a processing module configured to: when the quantity of UEs in the slice reaches a maximum value or the quantity of PDU sessions in the slice reaches a maximum value, start a congestion control mechanism; or when an analysis result related to congestion control has been received from the NWDAF, start the congestion control mechanism; or when the analysis result related to congestion control has been received from the NWDAF, transmit a congestion control indicator to the PCF, the AMF, the NSSF or the NSQ.

To be specific, the analysis result related to the congestion control further includes third timestamp information, and the third timestamp information is used to indicate a time when the quantity of UEs in the slice reaches the maximum value and/or a time when the quantity of PDU sessions in the slice reaches the maximum value. The processing module is configured to, when the analysis result related to congestion control has been received from the NWDAF, start the congestion control mechanism at the time indicated through the third timestamp information.

In a possible embodiment of the present disclosure, the processing module is configured to: when the analysis result related to congestion control has been received from the NWDAF, transmit a congestion control indicator to the PCF, the AMF, the NSSF or the NSQ at the time indicated through the third timestamp information; or when the analysis result related to congestion control has been received from the NWDAF, transmit the congestion control indicator and the third timestamp information to the PCF, the AMF, the NSSF or the NSQ.

In a possible embodiment of the present disclosure, the target network element is an AMF. At this time, the processing module includes: a first transmission sub-module configured to, when the quantity of UEs in the slice reaches the maximum value or the congestion control indicator has been received, transmit an NGAP OVERLOAD START message to an RAN, the message including a slice identifier; and a second transmission sub-module configured to, when the quantity of UEs in the slice is smaller than the maximum value, transmit an NGAP OVERLOAD STOP message to the RAN, the message including the slice identifier.

In a possible embodiment of the present disclosure, the target network element is an NF. At this time, the processing module includes: a third transmission sub-module configured to, when the quantity of UEs in the slice reaches the maximum value or the congestion control indicator has been received, transmit a first notification message to the AMF, the first notification message being used to indicate that the quantity of UEs in the slice has reached the maximum value or S-NSSAI congestion occurs; and a fourth transmission sub-module configured to, when the quantity of UEs in the slice is smaller than the maximum value, transmit a second notification message to the AMF, the second notification message being used to indicate that the quantity of UEs in the slices has not reached the maximum value or a S-NSSAI congestion is stopped.

In a possible embodiment of the present disclosure, the target network element is a PCF, an NSSF or an NSQ. At this time, the processing module includes: a fifth transmission sub-module configured to, when the quantity of PDU sessions in the slice has reached the maximum value or the congestion control indicator has been received, transmit a third notification message to the AMF or an SMF, the third notification message being used to indicate that the quantity of PDU sessions in the slice has reached the maximum value or an S-NSSAI SM congestion occurs; and a sixth transmission module configured to, when the quantity of PDU sessions in the slice is smaller than the maximum value, transmit a fourth notification message to the AMF or SMF, the fourth notification message being used to indicate that the quantity of UEs in the slice has not reached the maximum value or an S-NSSAI congestion does not occur.

In a possible embodiment of the present disclosure, the target network element is an AMF. The information processing method further includes a third transmission module configured to transmit an update request to an RF, and the update request includes a slice identifier, information of an AMF set or a slice coverage region, and at least one of the analysis result related to the quantity of UEs in the slice or the analysis result related to the quantity of PDU sessions in the slice.

The information processing device in the embodiments of the present disclosure is used to perform the above-mentioned information processing method with a similar principle and a similar technical effect, which will not be particularly defined herein.

Figure 10:
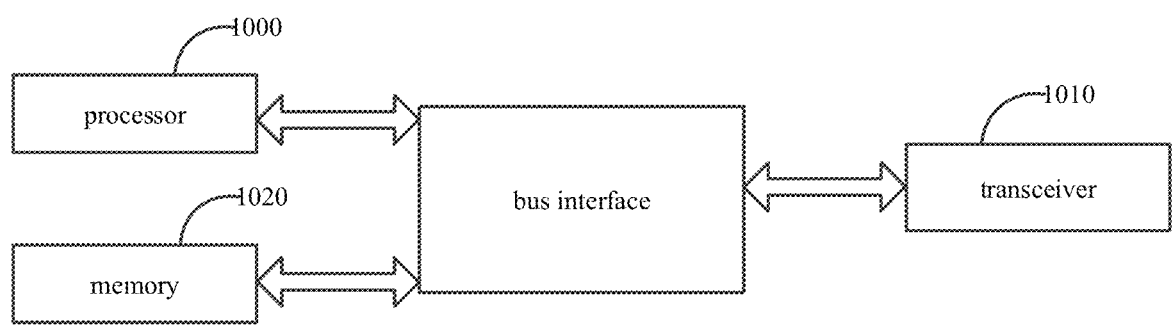
FIG. 10 is a schematic view showing an information processing apparatus according to an embodiment of the present disclosure.

As shown in FIG. 10, the present disclosure provides in some embodiments an information processing apparatus for an NWDAF, which includes a processor 1000, a transceiver 1010 and a memory 1020. The processor 1000 is configured to read a program in the memory 1020, so as to: obtain information of a slice; determine at least one of an analysis result related to the quantity of UEs in the slice or an analysis result related to the quantity of PDU sessions in the slice in accordance with the information of the slice; and transmit at least one of the analysis result related to the quantity of UEs or the analysis result related to the quantity of PDU sessions to a target network element. The transceiver 1010 is configured to receive and transmit data under the control of the processor 1000.

In FIG. 10, bus architecture may include a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit. A bus interface may be provided, and the transceiver 1010 may consist of a plurality of elements, i.e., a transmitter and a receiver for communication with any other devices over a transmission medium. The processor 1000 may take charge of managing the bus architecture as well as general processings. The memory 1020 may store therein data for the operation of the processor 1000.

The processor 1000 may take charge of managing the bus architecture as well as general processings. The memory 1020 may store therein data for the operation of the processor 1000.

In a possible embodiment of the present disclosure, the information of the slice includes at least one of a slice rate obtained from an OAM or RAN node or a UPF, the average quantity of UEs or the peak quantity of UEs obtained from the target network element, the average quantity of PDU sessions or the peak quantity of PDU sessions obtained from the target network element, or an average slice rate or a peak slice rate obtained from the target network element.

In a possible embodiment of the present disclosure, the processor 1000 is further configured to read the program in the memory to: obtain region information; and transmit at least one of the analysis result related to the quantity of UEs or the analysis result related to the quantity of PDU sessions to the target network element in accordance with the region information, or determine the maximum quantity of UEs or the maximum quantity of PDU sessions of the slice in different regions in accordance with the region information and transmit the maximum quantity of UEs or the maximum quantity of PDU sessions to a network function in the region. The target network element is located in the region corresponding to the region information.

In a possible embodiment of the present disclosure, the region information includes information of an AMF set or a slice coverage region. The processor 1000 is further configured to read the program in the memory to: obtain information of the UE, the information of the UE including at least one of a service behavior of the UE, subscription information of the UE and a capability of the UE; and obtain at least one of the analysis result related to the quantity of UEs or the analysis result related to the quantity of PDU sessions in accordance with the slice rate, the information of the UE and statistical information of slice rates of the slice in different regions.

In a possible embodiment of the present disclosure, the processor 1000 is further configured to read the program in the memory, so as to determine an analysis result related to a backoff timer, and transmit the analysis result related to the backoff timer to the target network element.

In a possible embodiment of the present disclosure, the processor 1000 is further configured to read the program in the memory to: obtain first timestamp information and second timestamp information; and determine the analysis result related to the backoff timer in accordance with the first timestamp information and the second timestamp information. The first timestamp information is transmitted by an OAM or RAN node or a UPF when the OAM or RAN node or the UPF detects that the slice rate reaches a maximum value, and the second timestamp information is transmitted by the OAM or RAN node or the UPF when the OAM or RAN node or the UPF detects that the slice rate is smaller than the maximum value for the first time after the slice rate has reached the maximum value; or the first timestamp information is transmitted by the target network element when the target network element detects that the quantity of UEs reaches a maximum value, and the second timestamp information is transmitted by the target network element when the target network element detects that the quantity of UEs is smaller than the maximum value for a first time after the quantity of UEs has reached the maximum value; or the first timestamp information is transmitted by the target network element when the target network element detects that the quantity of PDU sessions has reached a maximum value, and the second timestamp information is transmitted by the target network element when the target network element detects that the quantity of PDU sessions is smaller than the maximum value for the first time after the quantity of PDU sessions has reached the maximum value.

In a possible embodiment of the present disclosure, the processor 1000 is further configured to read the program in the memory, so as to transmit an analysis result related to congestion control to the target network element.

In a possible embodiment of the present disclosure, the analysis result related to congestion control further includes third timestamp information, and the third timestamp information is used to indicate a time when the quantity of UEs in the slice reaches the maximum value and/or a time when the quantity of PDU sessions in the slice reaches the maximum value.

The information processing apparatus in the embodiments of the present disclosure is used to perform the above-mentioned information processing method with a similar principle and a similar technical effect, which will not be particularly defined herein.

Figure 11:
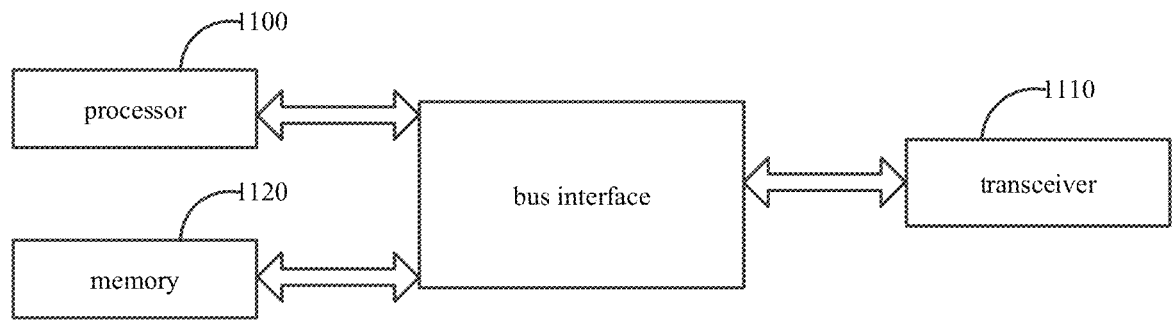
FIG. 11 is another schematic view showing the information processing apparatus according to an embodiment of the present disclosure.

As shown in FIG. 11, the present disclosure further provides in some embodiments an information processing apparatus for a target network element, which includes a processor 1100, a transceiver 1110 and a memory 1120. The processor 1100 is configured to read a program in the memory 1120, so as to receive at least one of an analysis result related to the quantity of UEs or an analysis result related to the quantity of PDU sessions from an NWDAF. The transceiver 1110 is configured to receive and transmit data under the control of the processor 1100.

In FIG. 11, bus architecture may include a number of buses and bridges connected to each other, so as to connect various circuits for one or more processors 1100 and one or more memories 1120. In addition, as is known in the art, the bus architecture may be used to connect any other circuits, such as a circuit for a peripheral device, a circuit for a voltage stabilizer and a power management circuit. A bus interface may be provided, and the transceiver 1110 may consist of a plurality of elements, i.e., a transmitter and a receiver for communication with any other devices over a transmission medium. The processor 1100 may take charge of managing the bus architecture as well as general processings. The memory 1120 may store therein data for the operation of the processor 1100.

The processor 1100 may take charge of managing the bus architecture as well as general processings. The memory 1120 may store therein data for the operation of the processor 1100.

In a possible embodiment of the present disclosure, the processor 1100 is further configured to read the program in the memory to: when the quantity of UEs in the slice reaches a maximum value or the quantity of PDU sessions in the slice reaches a maximum value, start a congestion control mechanism; or when an analysis result related to congestion control has been received from the NWDAF, start the congestion control mechanism; or when the analysis result related to congestion control has been received from the NWDAF, transmit a congestion control indicator to a PCF, an AMF, an NSSF or an NSQ.

In a possible embodiment of the present disclosure, the analysis result related to the congestion control further includes third timestamp information, and the third timestamp information is used to indicate a time when the quantity of UEs in the slice reaches the maximum value or the quantity of PDU sessions in the slice reaches the maximum value. The processor 1100 is further configured to read the program, so as to, when the analysis result related to congestion control has been received from the NWDAF, start the congestion control mechanism at the time indicated through the third timestamp information.

In a possible embodiment of the present disclosure, the processor 1100 is further configured to read the program in the memory to: when the analysis result related to congestion control has been received from the NWDAF, start the congestion control mechanism at the time indicated through the third timestamp information; or when the analysis result related to congestion control has been received from the NWDAF, transmit the congestion control indicator to a PCF, an AMF, an NSSF or an NSQ at the time indicated through the third timestamp information; or when the analysis result related to congestion control has been received from the NWDAF, transmit the congestion control indicator and the third timestamp information to the PCF, the AMF, the NSSF or the NSQ.

In a possible embodiment of the present disclosure, the target network element is the AMF, and the processor 1100 is further configured to read the program in the memory to: when the quantity of UEs in the slice reaches the maximum value or the congestion control indicator has been received, transmit an NGAP OVERLOAD START message to an RAN, the message including a slice identifier; and when the quantity of UEs in the slice is smaller than the maximum value, transmit an NGAP OVERLOAD STOP message to the RAN, the message including the slice identifier.

In a possible embodiment of the present disclosure, the target network element is the PCF, NSSF or NSQ, and the processor 1100 is further configured to read the program in the memory to: when the quantity of UEs in the slice reaches the maximum value or the congestion control indicator has been received, transmit a first notification message to the AMF, the first notification message being used to indicate that the quantity of UEs in the slice has reached the maximum value or S-NSSAI congestion occurs; and when the quantity of UEs in the slice is smaller than the maximum value, transmit a second notification message to the AMF, the second notification message being used to indicate that the quantity of UEs in the slices has not reached the maximum value or a S-NSSAI congestion is stopped.

In a possible embodiment of the present disclosure, the target network element is the PCF, NSSF or NSQ, and the processor 1100 is further configured to read the program in the memory to: when the quantity of PDU sessions in the slice has reached the maximum value or the congestion control indicator has been received, transmit a third notification message to the AMF or an SMF, the third notification message being used to indicate that the quantity of PDU sessions in the slice has reached the maximum value or an S-NSSAI SM congestion occurs; and when the quantity of PDU sessions in the slice is smaller than the maximum value, transmit a fourth notification message to the AMF or SMF, the fourth notification message being used to indicate that the quantity of UEs in the slice has not reached the maximum value or an S-NSSAI congestion does not occur.

In a possible embodiment of the present disclosure, the target network element is the AMF, and the processor 1100 is further configured to read the program in the memory, so as to transmit an update request to an RF, and the update request includes a slice identifier, information of an AMF set or a slice coverage region, and at least one of the analysis result related to the quantity of UEs in the slice or the analysis result related to the quantity of PDU sessions in the slice.

The information processing apparatus in the embodiments of the present disclosure is used to perform the above-mentioned information processing method with a similar principle and a similar technical effect, which will not be particularly defined herein.

The present disclosure further provides in some embodiments a readable storage medium storing therein a program. The program is executed by a processor so as to implement the above-mentioned information processing methods with a same technical effect, which will not be particularly defined herein. The readable storage medium is a Read-Only Memory (ROM), a Random Access Memory (RAM), a magnetic disc or an optical disc.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

It should be further appreciated that, the above modules in the network device and the UE are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A or B" in the specification and the appended claims shall be understood as "there is only A, there is only B, or there are both A and B".

The embodiments of the present disclosure have been described above in conjunction with the drawings, but the present disclosure is not limited to the above-mentioned specific embodiments, which are merely illustrative rather than restrictive. Under the teaching of the present disclosure, many forms can be made without departing from the principle of the present disclosure and the protection scope of the claims, which also fall within the protection of the present disclosure.

What is claimed is:

1. An information processing method for a Network Data Analytics Functions (NWDAF), comprising:
obtaining information of a slice;
determining, in accordance with the information of the slice, at least one of an analysis result related to the quantity of User Equipments (UEs) in the slice or an analysis result related to the quantity of Protocol Data Unit (PDU) sessions in the slice; and
transmitting at least one of the analysis result related to the quantity of UEs or the analysis result related to the quantity of PDU sessions to a target network element;
wherein the information processing method further comprises:
when the quantity of UEs in the slice reaches a maximum value or the quantity of PDU sessions in the slice reaches a maximum value, transmitting at least one of the analysis result related to the quantity of UEs or the analysis result related to the quantity of PDU sessions to instruct the target network element to start a congestion control mechanism,
wherein the target network element is a Policy Control Function (PCF), a Network Slice Selection Function (NSSF), or a Network Slice Quota (NSQ), and transmitting at least one of the analysis result related to the quantity of UEs or the analysis result related to the quantity of PDU sessions to instruct the target network element to start the congestion control mechanism comprises:
when the quantity of UEs in the slice reaches the maximum value or the congestion control indicator has been received, instructing the target network element to transmit a first notification message to an Access and Mobility Management Function (AMF), the first notification message being used to indicate that the quantity of UEs in the slice has reached the maximum value or Single Network Slice Selection Assistance Information (S-NSSAI) congestion occurs;
when the quantity of UEs in the slice is smaller than the maximum value, instructing the target network element to transmit a second notification message to the AMF, the second notification message being used to indicate that the quantity of UEs in the slice has not reached the maximum value or an S-NSSAI congestion is stopped, or,
wherein the target network element is a Policy Control Function (PCF), a Network Slice Selection Function (NSSF), or a Network Slice Quota (NSQ), and the starting the congestion control mechanism comprises:
when the quantity of PDU sessions in the slice has reached the maximum value or the congestion control indicator has been received, instructing the target network element to transmit a third notification message to the AMF or a Session Management Function (SMF), the third notification message being used to indicate that the quantity of PDU sessions in the slice has reached the maximum value or an S-NSSAI congestion occurs;
when the quantity of PDU sessions in the slice is smaller than the maximum value, instructing the target network element to transmit a fourth notification message to the AMF or SMF, the fourth notification message being used to indicate that the quantity of UEs in the slice has not reached the maximum value or an S-NSSAI congestion does not occur.

2. The information processing method according to claim 1, wherein the information of the slice further comprises at least one of:
the average quantity of UEs or the peak quantity of UEs obtained from the target network element, or the average quantity of PDU sessions or the peak quantity of PDU sessions obtained from the target network element.

3. The information processing method according to claim 2, wherein subsequent to obtaining the information of the slice, the information processing method further comprises:
obtaining region information,
wherein the transmitting at least one of the analysis result related to the quantity of UEs or the analysis result related to the quantity of PDU sessions to the target network element comprises:
transmitting at least one of the analysis result related to the quantity of UEs or the analysis result related to the quantity of PDU sessions to the target network element in accordance with the region information; or
determining the maximum quantity of UEs or the maximum quantity of PDU sessions of the slice in different regions in accordance with the region information, and transmitting the maximum quantity of UEs or the maximum quantity of PDU sessions to a network function in the region,
wherein the target network element is located in the region corresponding to the region information.

4. The information processing method according to claim 3, wherein the region information comprises information of the AMF set or a slice coverage region,
wherein the determining, in accordance with the information of the slice, at least one of the analysis result related to the quantity of UEs in the slice or the analysis result related to the quantity of PDU sessions in the slice comprises:
obtaining information of the UE, the information of the UE comprising at least one of a service behavior of the UE, subscription information of the UE and a capability of the UE; and
obtaining at least one of the analysis result related to the quantity of UEs or the analysis result related to the quantity of PDU sessions in accordance with the slice rate, the information of the UE and statistical information of slice rates of the slice in different regions.

5. The information processing method according to claim 1, wherein the determining the analysis result related to the backoff timer comprises:
obtaining first timestamp information and second timestamp information; and
determining the analysis result related to the backoff timer in accordance with the first timestamp information and the second timestamp information,
wherein the first timestamp information is transmitted by an OAM or RAN node or a UPF when the OAM or RAN node or the UPF detects that the slice rate reaches a maximum value, and the second timestamp information is transmitted by the OAM, the RAN node or the UPF when the OAM or RAN node or the UPF detects that the slice rate is smaller than the maximum value for a first time after the slice rate has reached the maximum value; or
the first timestamp information is transmitted by the target network element when the target network element detects that the quantity of UEs reaches a maximum value, and the second timestamp information is transmitted by the target network element when the target network element detects that the quantity of UEs is smaller than the maximum value for a first time after the quantity of UEs has reached the maximum value; or the first timestamp information is transmitted by the target network element when the target network element detects that the quantity of PDU sessions has reached a maximum value, and the second timestamp information is transmitted by the target network element when the target network element detects that the quantity of PDU sessions is smaller than the maximum value for a first time after the quantity of PDU sessions has reached the maximum value.

6. The information processing method according to claim 1, further comprising:
transmitting an analysis result related to congestion control to the target network element.

7. The information processing method according to claim 6, wherein the analysis result related to the congestion control further comprises third timestamp information, and the third timestamp information is used to indicate a time when the quantity of UEs in the slice reaches the maximum value and/or a time when the quantity of PDU sessions in the slice reaches the maximum value.

8. An information processing method performed by a target network element, comprising:
receiving from an NWDAF at least one of an analysis result related to the quantity of UEs or an analysis result related to the quantity of PDU sessions;
wherein the information processing method further comprises:
when the quantity of UEs in the slice reaches a maximum value or the quantity of PDU sessions in the slice reaches a maximum value, starting a congestion control mechanism,
wherein the target network element is a Policy Control Function (PCF), a Network Slice Selection Function (NSSF), or a Network Slice Quota (NSQ), and the starting the congestion control mechanism comprises:
when determining that the quantity of UEs in the slice reaches the maximum value or the congestion control indicator has been received, transmitting a first notification message to the AMF, the first notification message being used to indicate that the quantity of UEs in the slice has reached the maximum value or Single Network Slice Selection Assistance Information (S-NSSAI) congestion occurs;
when determining that the quantity of UEs in the slice is smaller than the maximum value, transmitting a second notification message to the AMF, the second notification message being used to indicate that the quantity of UEs in the slice has not reached the maximum value or an S-NSSAI congestion is stopped, or,
wherein the target network element is a Policy Control Function (PCF), a Network Slice Selection Function (NSSF), or a Network Slice Quota (NSQ), and the starting the congestion control mechanism comprises:
when determining that the quantity of PDU sessions in the slice has reached the maximum value or the congestion control indicator has been received, transmitting a third notification message to the AMF or a Session Management Function (SMF), the third notification message being used to indicate that the quantity of PDU sessions in the slice has reached the maximum value or an S-NSSAI congestion occurs;

when determining that the quantity of PDU sessions in the slice is smaller than the maximum value, transmitting a fourth notification message to the AMF or SMF, the fourth notification message being used to indicate that the quantity of UEs in the slice has not reached the maximum value or an S-NSSAI congestion does not occur.

9. The information processing method according to claim 8, wherein the target network element further comprises:
an Access and Mobility Management Function (AMF), or a quota configuration function.

10. The information processing method according to claim 9, wherein the quota configuration function comprises:
a Unified Data Management (UDM), a Unified Data Repository (UDR), an OAM, an Operation & Maintenance (O&M), or a Network Repository Function (NRF).

11. The information processing method according to claim 10, wherein the information processing method is applied to the quota configuration function, and further comprises:
determining the maximum quantity of UEs or the maximum quantity of PDU sessions in a slice, and transmitting the maximum quantity of UEs or the maximum quantity of PDU sessions to the PCF, the AMF, the NSSF or the NSQ.

12. The information processing method according to claim 8, further comprising:
when an analysis result related to congestion control has been received from the NWDAF, starting the congestion control mechanism; or
when the analysis result related to congestion control has been received from the NWDAF, transmitting a congestion control indicator to the PCF, the AMF, the NSSF or the NSQ.

13. The information processing method according to claim 12, wherein the analysis result related to the congestion control further comprises third timestamp information, and the third timestamp information is used to indicate a time when the quantity of UEs in the slice reaches the maximum value and/or a time when the quantity of PDU sessions in the slice reaches the maximum value,
wherein the starting the congestion control mechanism when the analysis result related to the congestion control has been received from the NWDAF comprises,
when the analysis result related to the congestion control has been received from the NWDAF, starting the congestion control mechanism at a time indicated through the third timestamp information,
wherein the transmitting the congestion control indicator to the PCF, the AMF, the NSSF or the NSQ when the analysis result related to the congestion control has been received from the NWDAF comprises:
when the analysis result related to the congestion control has been received from the NWDAF, transmitting the congestion control indicator to the PCF, the AMF, the NSSF or the NSQ at the time indicated through the third timestamp information; or
when the analysis result related to the congestion control has been received from the NWDAF, transmitting the congestion control indicator and the third timestamp information to the PCF, the AMF, the NSSF or the NSQ.

14. The information transmission method according to claim 12, wherein the target network element is the AMF, and the starting the congestion control mechanism comprises:
- when determining that the quantity of UEs in the slice reaches the maximum value or the congestion control indicator has been received, transmitting an NGAP OVERLOAD START message to an RAN, the NGAP OVERLOAD START message comprising a slice identifier; and
- when determining that the quantity of UEs in the slice is smaller than the maximum value, transmitting an NGAP OVERLOAD STOP message to the RAN, the message comprising the slice identifier.

15. The information processing method according to claim 9, wherein the target network element is the AMF, and the information processing method further comprises:
- transmitting an update request to a Repository Function (RF), and the update request comprises a slice identifier, information of an AMF set or a slice coverage region, and at least one of the analysis result related to the quantity of UEs in the slice or the analysis result related to the quantity of PDU sessions in the slice.

16. An information processing apparatus arranged at an NWDAF, comprising a transceiver, a memory, a processor, and a program stored in the memory and used to be executed by the processor,
- wherein the processor is configured to read a program stored in the memory to:
- obtain information of a slice;
- determine, in accordance with the information of the slice, at least one of an analysis result related to the quantity of UEs in the slice or an analysis result related to the quantity of PDU sessions in the slice;
- transmit at least one of the analysis result related to the quantity of UEs or the analysis result related to the quantity of PDU sessions to a target network element;
- wherein the processor is further configured to read the program stored in the memory to:
- when the quantity of UEs in the slice reaches a maximum value or the quantity of PDU sessions in the slice reaches a maximum value, transmit at least one of the analysis result related to the quantity of UEs or the analysis result related to the quantity of PDU sessions to instruct the target network element to start a congestion control mechanism,
- wherein the target network element is a Policy Control Function (PCF), a Network Slice Selection Function (NSSF), or a Network Slice Quota (NSQ), and the processor is further configured to read the program stored in the memory to:
- when the quantity of UEs in the slice reaches the maximum value or the congestion control indicator has been received, instruct the target network element to transmit a first notification message to an Access and Mobility Management Function (AMF), the first notification message being used to indicate that the quantity of UEs in the slice has reached the maximum value or Single Network Slice Selection Assistance Information (S-NSSAI) congestion occurs;
- when the quantity of UEs in the slice is smaller than the maximum value, instruct the target network element to transmit a second notification message to the AMF, the second notification message being used to indicate that the quantity of UEs in the slice has not reached the maximum value or an S-NSSAI congestion is stopped, or,
- wherein the target network element is a Policy Control Function (PCF), a Network Slice Selection Function (NSSF), or a Network Slice Quota (NSQ), and the processor is further configured to read the program stored in the memory to:
- when the quantity of PDU sessions in the slice has reached the maximum value or the congestion control indicator has been received, instruct the target network element to transmit a third notification message to the AMF or a Session Management Function (SMF), the third notification message being used to indicate that the quantity of PDU sessions in the slice has reached the maximum value or an S-NSSAI congestion occurs;
- when the quantity of PDU sessions in the slice is smaller than the maximum value, instruct the target network element to transmit a fourth notification message to the AMF or SME, the fourth notification message being used to indicate that the quantity of UEs in the slice has not reached the maximum value or an S-NSSAI congestion does not occur.

17. An information processing apparatus for a target network element, comprising a transceiver, a memory, a processor, and a program stored in the memory and used to be executed by the processor,
- wherein the processor is configured to read the program in the memory to implement the information processing method according to claim 8.

* * * * *